United States Patent [19]

Buck et al.

[11] 4,298,775

[45] Nov. 3, 1981

[54] MICROPROCESSOR CONTROLLED TELEPHONE SET

[75] Inventors: Norman R. Buck, Sioux Falls, S. Dak.; David J. Hanson, Apple Valley, Minn.

[73] Assignee: Vital Signs, Inc., Minnetonka, Minn.

[21] Appl. No.: 20,325

[22] Filed: Mar. 14, 1979

[51] Int. Cl.³ ............................................. H04M 1/00
[52] U.S. Cl. .............................. 179/81 R; 179/90 B; 179/90 K
[58] Field of Search ............... 179/81 R, 2 DP, 90 K, 179/90 B, 90 AN

[56] References Cited

U.S. PATENT DOCUMENTS 3,932,709 1/1976 Hoff et al. ................... 179/90 AN

*Primary Examiner*—Bernard Konick
*Assistant Examiner*—Joseph A. Popek
*Attorney, Agent, or Firm*—Merchant, Gould, Smith, Edell, Welter & Schmidt

[57] ABSTRACT

The present invention is a telephone set for use in a telephone network in which a central switch gear is connected to incoming telephone lines and to a plurality of telephone stations. The switch gear serves to establish communication between selected stations and/or the incoming lines. The switch gear further has a memory and capability to receive command signals from the individual telephone set, and transmit confirmation signals to the set and perform selected functions in response to the command signals. The telephone itself has a plurality of manually actuated switches (51–56), each of which corresponds to a selected function. The set also has a programmable microprocessor (10) that automatically scans the switches, detects an actuated switch and generates a command signal corresponding to a selected function. The set has apparatus (440) for transmitting the command signals to the switch gear and apparatus (460–467) for receiving confirmation signals from the switch gear and transmitting the confirmation signals to the microprocessor. Finally, the telephone set has apparatus for transmitting and receiving voice communications.

7 Claims, 20 Drawing Figures

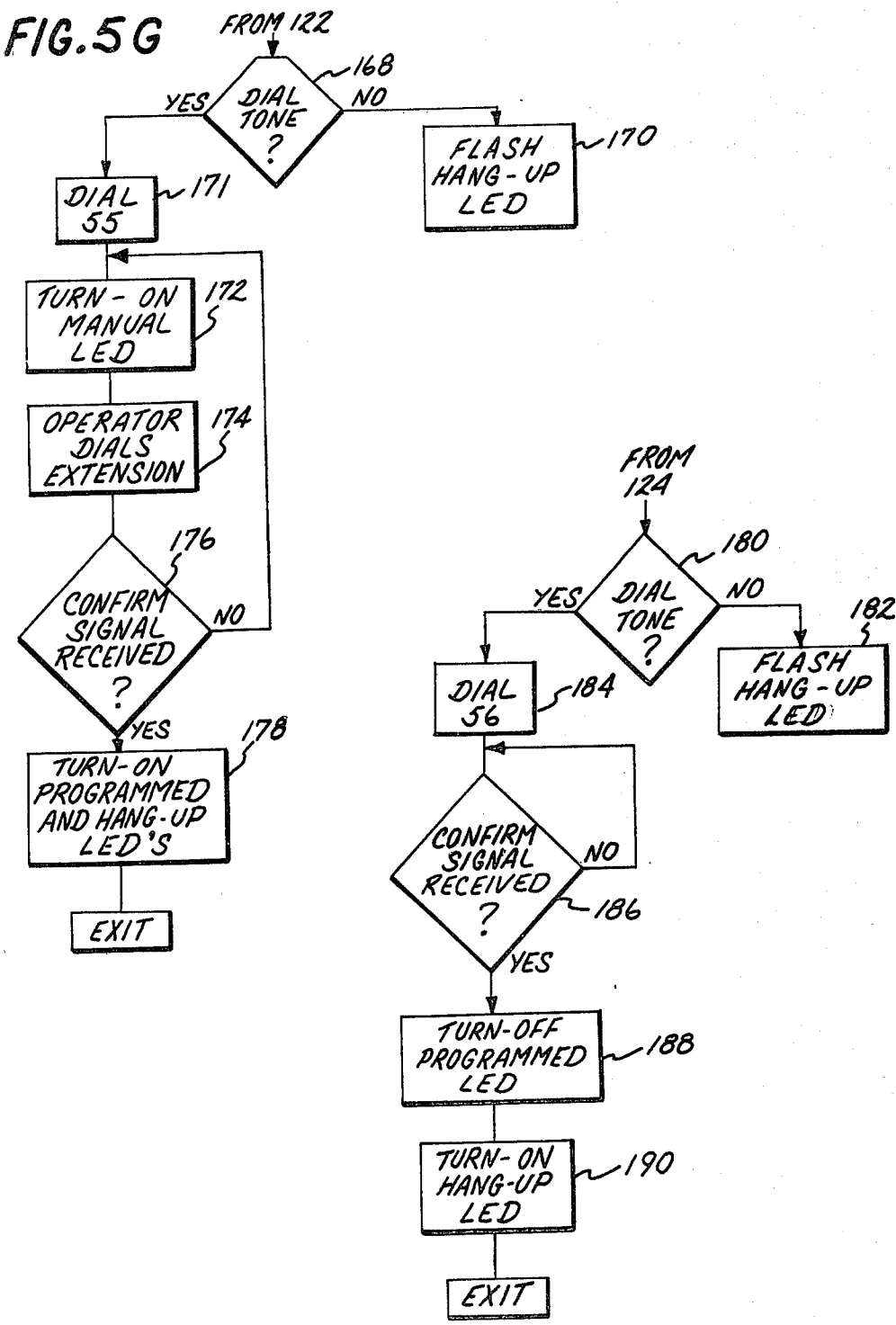

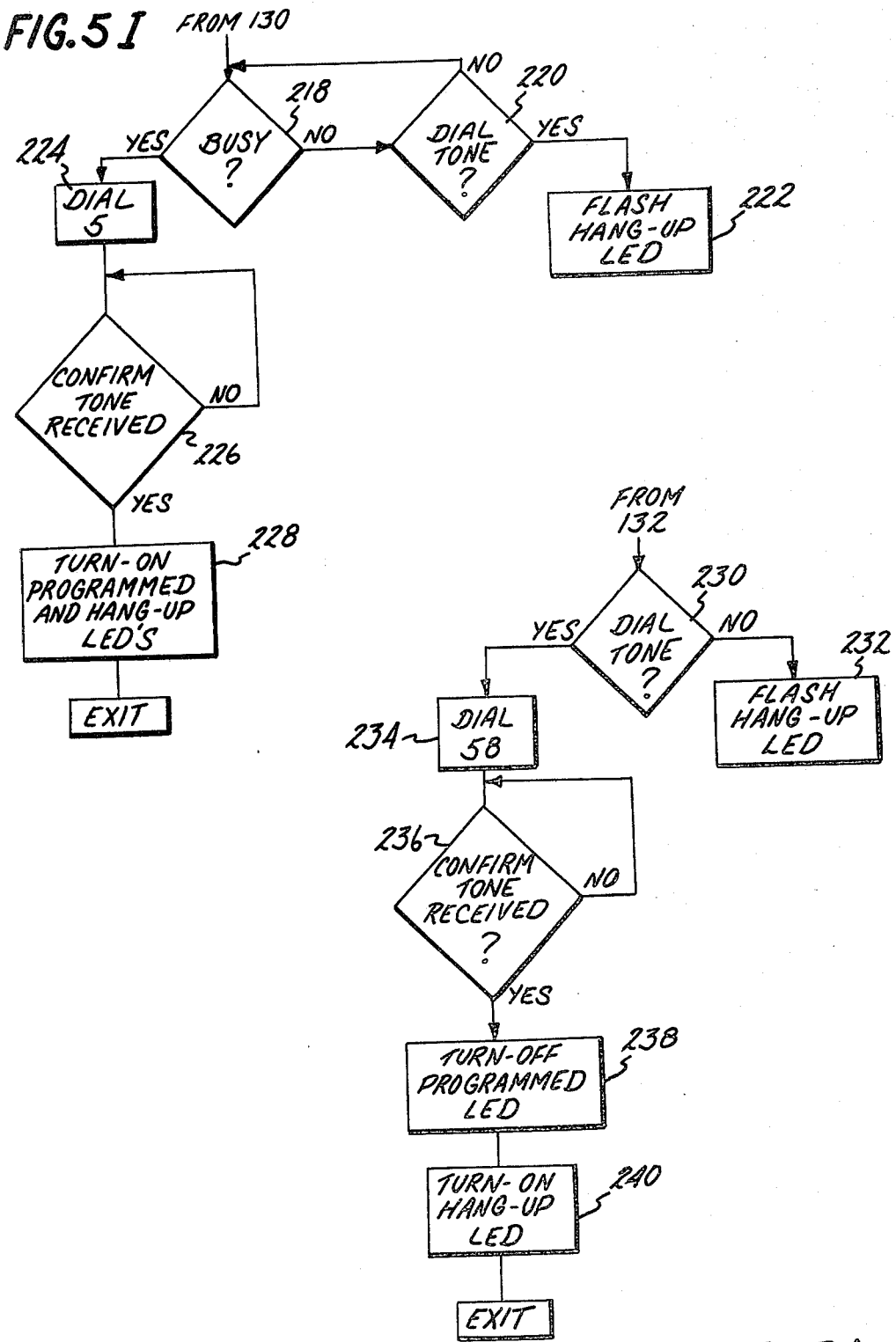

A
MICROPROCESSOR CONTROLLED TELEPHONE SET

BACKGROUND OF THE INVENTION

The present invention relates broadly to a telephone communication system and in particular to a microprocessor controlled telephone designed to be compatible with existing switch gear that enables a plurality of functions to be accomplished by the telephone operator.

Highly sophisticated switch gear is currently available from a number of different manufacturing sources, and these switching systems generally include a memory and computing capability to permit various functions to be performed. For example, the switch gear can be programmed to automatically transfer calls from one extension to another so that an individual can have his calls received at a location removed from his regular work station. Another exemplary function may be referred to as a speed call function whereby a plurality of frequently used numbers can be stored in the memory of the switch gear which will automatically dial the complete number once the operator at the telephone dials an abbreviated number. These two functions, i.e. the call forwarding and speed call functions, are merely representative of a plurality of various functions available with the current generation of switch gear. For the purposes herein it is contemplated that the switch gear is connected to one or more outside telephone lines provided by the telephone company and to a plurality of individual telephone sets, terminals and/or extensions. The switching system serves to provide communication between the incoming telephone lines and a selected one or more extensions.

In the prior art each individual operator is provided with various instructions for the steps that he must take to utilize the various functions available. For example, the operator is typically required to enter certain codes on the telephone keyboard to activate a specific function. The codes for each available function differ and the operator is required to remember the codes for these specific functions or refer to a listing of the codes each time he wishes to utilize a specific function. It has been found that in view of the requirements upon the operator to memorize the specific codes or refer to a listing of codes each time he wishes to actuate a function that the operator typically will simply ignore the various available functions significantly underutilizing the capabilities of the switch gear.

The prior art also includes individual telephone sets having the capability of transmitting and receiving both voice and data communications. Such prior art systems typically require one set of wires for voice communications and one or more sets of wires for data communications. The implementation of this type of "smart" telephone thus requires significantly more wiring than conventional two wire systems with the resultant increase in expense.

It is desirable to have a telephone set compatible with the present sophisticated switch gear and which will require relatively simple operator steps to initiate any one of a plurality of available functions. In certain applications, it is also desirable to have a telephone set with the capability of storing selected secure numbers at the telephone itself as opposed to the memory of the switching system so that only the operator of that particular telephone will have access to these secure numbers. Such a feature has particular applicability, for example, in the financial business where it may be desirable to have only selected persons capable of dialing specific numbers and conducting substantial financial transactions by telephone communication.

The present invention is an individual telephone set that meets the two criteria previously described and which has other advantages over the prior art systems. The telephone set of the present invention incorporates a microprocessor with a memory and computing capability and the operator by simply actuating a single easily read function key will initiate a desired function. The microprocessor responds to the operator request to establish communication with the switch gear and automatically initiate the desired function. Additionally, the microprocessor has a memory storage capability and is programmable to receive a plurality of individual secured numbers that may be known only to the individual operator and which can be recalled and automatically dialed. The telephone set of the present invention also communicates with the switching system over the conventional two-wire set eliminating the need for significant and expensive additional wiring required in the prior art "smart" telephone systems. The telephone of the present invention will encourage full utilization of the capabilities of the current line of sophisticated switch gear and make the incorporation of such systems into many telephone communication networks to be economically feasible and desirable.

SUMMARY OF THE INVENTION

The present invention is a telephone set for use in the telephone network with a switch gear connected to incoming telephone lines and to a plurality of individual telephone stations to establish communication between selected stations and/or incoming telephone lines. The switch gear has a memory and the capability of receiving command signals from the telephone set, transmitting confirmation signals to a set, and performing selected functions in response to the command signals. The telephone set comprises a plurality of manually actuated switches each of which corresponds to a selected function. A programmable microprocessor is included with means for automatically scanning the switches, detecting an actuated switch and generating a command signal corresponding to the selected function. The set has means for transmitting the command signal to the switch gear and means for receiving confirmation signals from the switch gear and transmitting the confirmation signals to the microprocessor. The set also has means for receiving and transmitting voice communications.

In the preferred embodiment, the means for transmitting command signals to the switch gear includes a tone generator connected to the microprocessor and which generates a coded tone command signal in response to an output signal from the microprocessor. The means for receiving confirmation signals from the switch gear include a plurality of tone detectors each of which is tuned to a preselected response frequency and which generate output signals which are applied to the microprocessor. Further, a plurality of visual indicators are provided and the microprocessor includes means for applying excitation signals to the visual indicators in response to output signals of the tone decoders providing a visual indication of the operation of the telephone set of the present invention. Finally, means are provided for disabling the audio microphone of the telephone set while the telephone set is receiving confirmation signals from the switch gear.

The telephone set of the present invention is connected to the switch gear over a conventional two-wire network and coded tone command signals and coded tone confirmation signals are transmitted between the telephone set and the switch gear over the two-wire network which also provides the voice communication lines. The operator of the telephone set of the present invention can activate a function by the simple manual actuation of a single switch. The operator thus is not required to remember multiple codes for each desired function. The telephone set is utilized with the conventional two-wire connections eliminating the necessity for additional wiring as is common in prior art systems. These and other advantages of the present invention will become apparent with reference to the accompanying drawings, detailed description of the preferred embodiment and claims.

DETAILED DESCRIPTION OF THE PREFERRED EMBODIMENT

Figure 1:
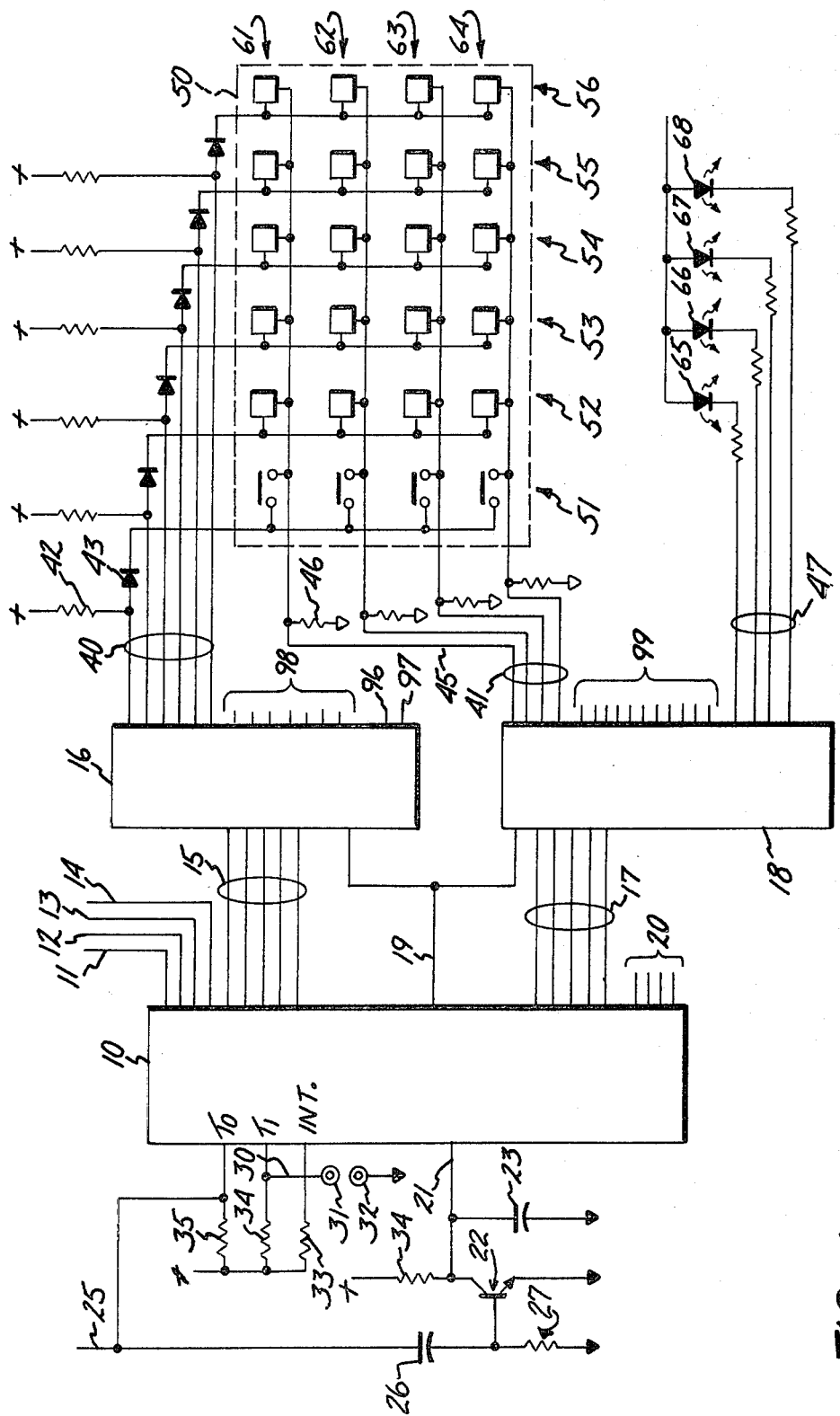
FIG. 1 is a schematic showing one portion of the circuitry of the telephone set of the present invention.
Figure 2:
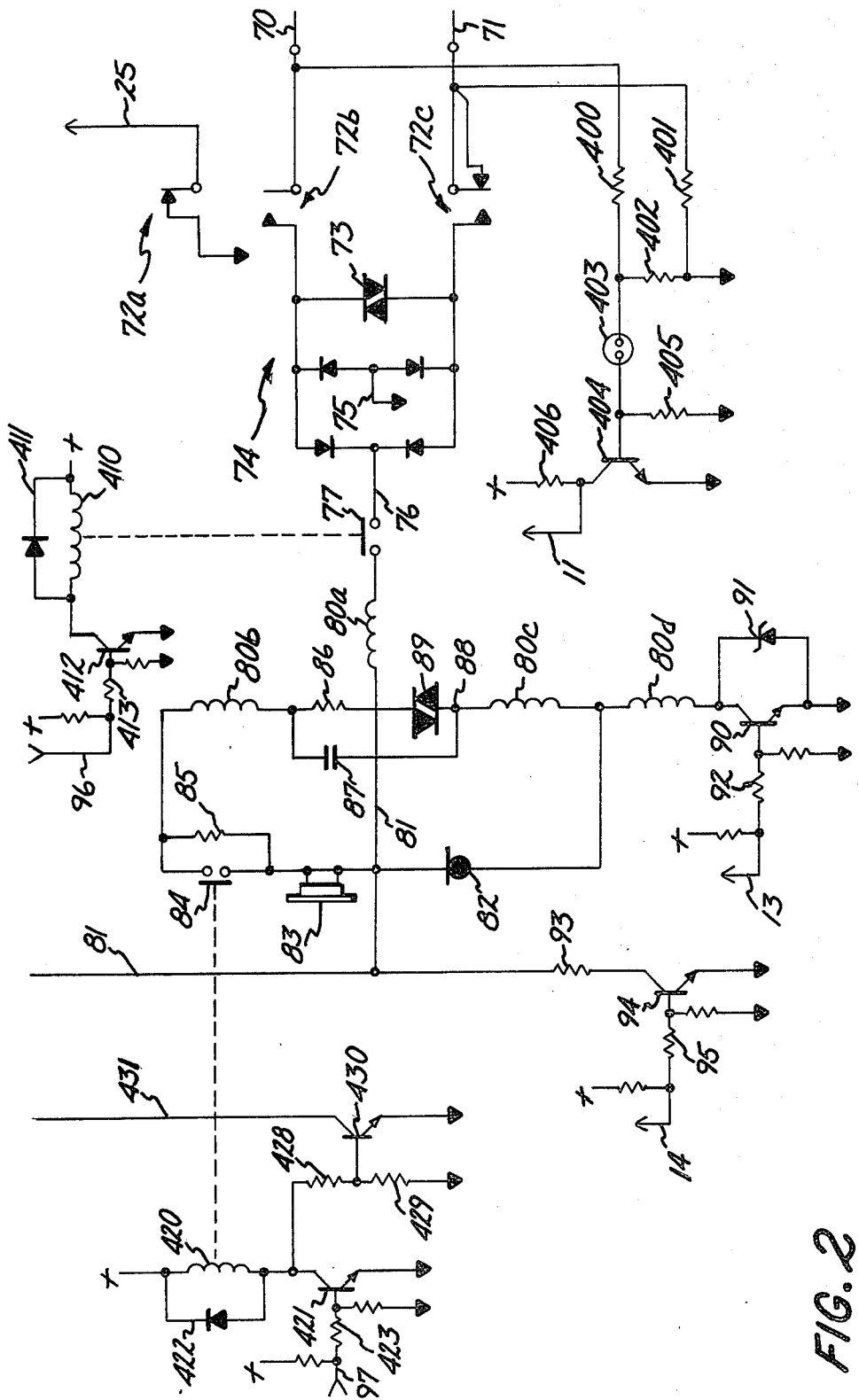
FIG. 2 is a schematic showing another portion of the circuitry of the telephone set of the present invention.
Figure 3:
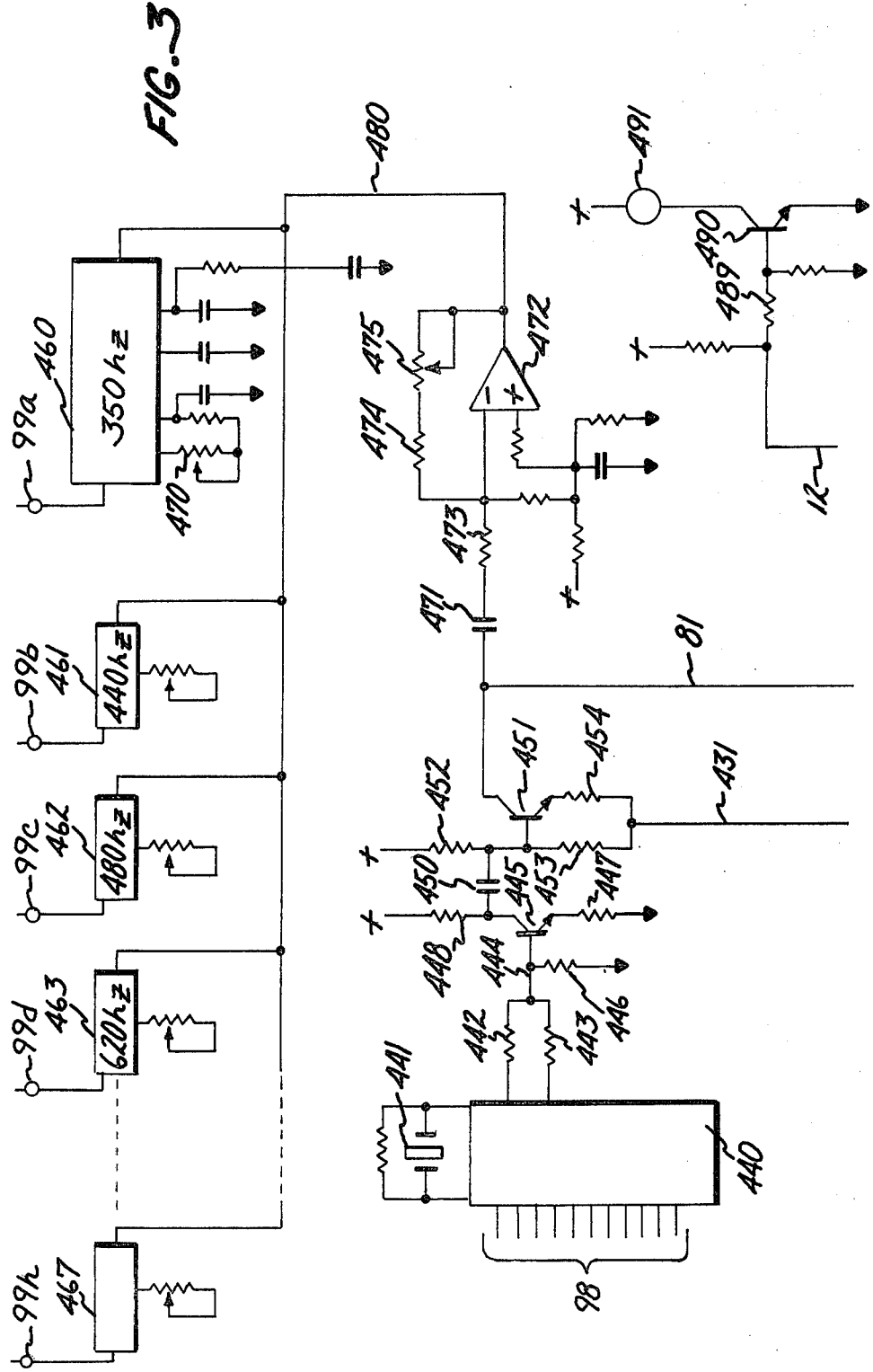
FIG. 3 is a third schematic showing another portion of the circuitry of the telephone set of the present invention.

The circuitry for a telephone set according to the preferred embodiment of the invention is shown in FIGS. 1, 2, and 3. The complete circuit has been divided into three drawings because of space limitations, and there are numerous interconnections among the three figures as will be indicated in the following description.

In the drawing, reference number 10 indicates the microprocessor portion of the circuit. In the preferred embodiment a commercially available microprocessor is used which includes its central processing unit, random access memory and read only memory all on the same chip of integrated circuit, but it will be understood that other types of microprocessors, including those having separate integrated circuit chips for memory could also be used. The integrated circuits and other components preferably plug into sockets provided on a circuit board within the telephone set, and the telephone can be adapted during the manufacturing stage for operation with different makes and models of switch gear by selection and plugging in of the proper microprocessor 10 having the variation of the control program corresponding to the switch gear with which it is to be used.

Microprocessor 10 has a plurality of data terminals which may be used as inputs or outputs depending upon the programmed utilization thereof. For purposes of this patent, these inputs/outputs will be referred to as ports. Four ports are connected to leads 11, 12, 13 and 14 which connect to portions of the circuitry on other figures. Five ports indicated by parallel data trunk 15 connect from microprocessor 10 to a port expander 16. Another data trunk 17 interconnects a plurality of ports of microprocessor 10 and a second port expander 18. The program control terminal of port expanders 16 and 18 connects by a lead 19 to the appropriate output terminal of microprocessor 10.

A plurality of additional ports 20 may be provided as is generally known in the art for connection to an additional expanded memory chip designed to increase the memory capacity of the microprocessor system. The additional memory can be provided if required for storage of additional telephone numbers for automatic dialing and the like.

The reset input of microprocessor 10 is connected to a lead 21 which connects from a collector of a transistor 22. Lead 21 also connects through capacitor 23 to signal ground, and through a load resistor 24 which connects from the collector of the transistor to the positive power supply, indicated by the plus symbol. An appropriate power supply is provided in the telephone for connection by a power cord to a suitable source of electrical power. The power supply provides the appropriate filtered and regulated voltage for operating microprocessor 10 and the other components of the circuit. The design of suitable power supplies is generally known in the art, and therefore the power supply is not shown in the drawings. Suitable power connections for microprocessor 10, the port expander, and the various other amplifiers and components are also provided, but are not shown in the drawings for purposes of clarity.

Lead 25 from FIG. 2 connects through a capacitor 26 to the base of transistor 22, which also connects through a resistor 27 to signal ground. A branch of lead 25 connects to the $T_0$ test input of microprocessor 10. Test input $T_1$ connects to a lead 30 which connects to a test terminal 31. Another test terminal 32 connects to signal ground, and it is preferably physically positioned adjacent terminal 31 so the two can be shorted together during a test procedure described in another portion of this specification. The INT input connects to a resistor 33, the other side of which connects to the power supply. Similarly, leads 30 and 25 connect through resistors 34 and 35, respectively, to the positive voltage source.

Some of the ports from expanders 16 and 18 are used for scanning the keyboard. Specifically, six ports indicated by reference number 40 are used for the columns of the keyboard, and four ports indicated by reference number 41 are used for the rows.

Figure 4:
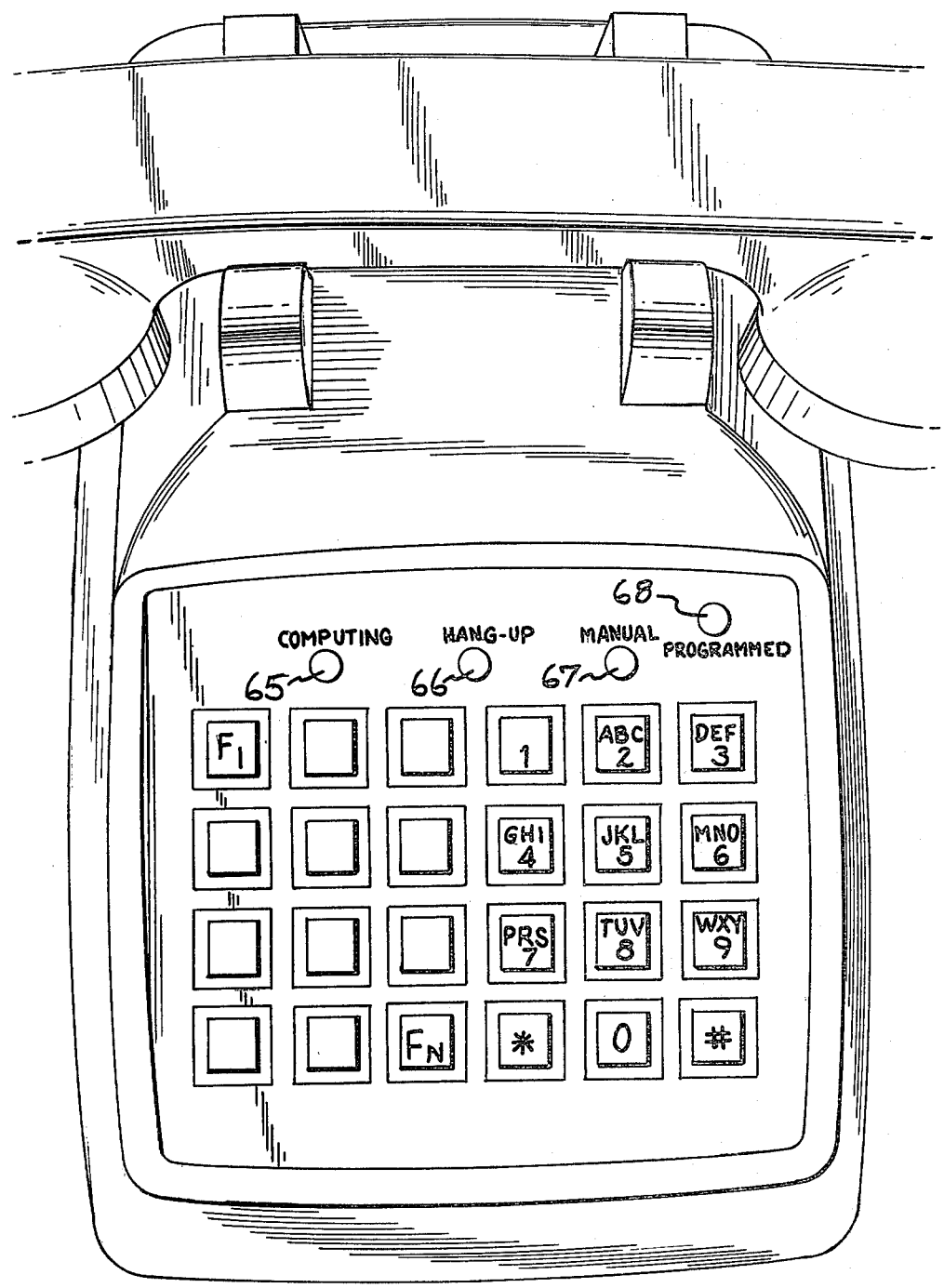
FIG. 4 is a view in perspective showing the face plate of the telephone set of the present invention.

The keyboard is shown pictorially in FIG. 4. It consists of an array of push buttons which in the embodiment shown comprises six columns and four rows, although a greater or lesser number of buttons can be provided, depending upon the number of intended functions. The three columns on the right include the digits 1–9, 0, and the star and pound symbol as in a conventional Touch-Tone keyboard. The three columns on the left are for the various functions, as explained in more detail below. In FIG. 4 they are indicated by the symbols $F_1$ through $F_n$. In practice, these buttons contain approprite legends such as "auto dial," "TRSFR call," and the like.

Referring again to FIG. 1, the keyboard switch assembly is indicated by the broken line. Reference numbers 51 through 56 indicate the six columns and reference numbers 61 through 64 indicate the rows. The switches are momentary contact single pull single throw switches as shown for column 1. For purposes of simplification, the switches for the remaining columns are shown as blocks, but it will be understood that they are identical to the switches of column 1, and are connected in a similar manner.

The first lead from the group of ports indicated by reference number 40 connects to a resistor 42 whose other end connects to the plus voltage supply, and through an isolation diode 43 to lead 44 which branches and connects to one terminal of each of these switches in column 51. The other ports indicated by reference number 40 in similar manner connect to pull-up resistors and connect through diodes to the switches in the other columns of the keyboard.

In similar manner, the leads from ports 41 connect to the other switch terminals for each switch in a given row, for example, lead 45 which connects to each switch in column 61. A resistor 46 connects lead 45 to signal ground, and similar resistors are provided for the other three rows.

In practice, the microprocessor includes a subroutine for scanning of the keyboards which it accomplishes by sequentially scanning through ports 40 and 41 in a pattern to cover each individual switch. If a switch has been pushed, completing a circuit therethrough, voltage levels will be shifted and this will be recognized by the microprocessor as a contact closure. It will be understood that a complete scan of the keyboard takes place in real time at a rapid rate compared with human reaction time in pushing the switches, so that no contact closures are missed.

Another four ports of expander 18, indicated by reference number 47, are used to operate four indicator LED's 65, 66, 67 and 68. These indicator LED's are used as panel displays. The anodes of these diodes connect to the positive voltage source, and their cathodes connect through current limiting resistors to port 47.

These LED indicators are panel displayed, as seen also in FIG. 4. LED 65 is used to indicate when the computer is operating in establishing a desired function. Indicator 66 tells the operator when to hang up, as for example at the completion of an operation, or in case of an error in the sequence of pushing buttons. LED 67 signals the operator that a manual operation is required from him, such as entering a telephone or extension number. LED 66 lights to indicate when the phone has been programmed, in, for example, in call forwarding or call forward busy functions. These indicators are operated by the microprocessor under program control as explained with reference to the flowchart herein. In addition, they can be used for tuning the tone decoders according to another aspect of the invention.

In FIG. 2, some of the conventional telephone circuits are shown, together with certain additional circuits according to the present invention. Reference numbers 70 and 71 indicate the pair of leads for the telephone line which extends to the telephone switching equipment. Reference numbers 72a, 72b, and 72c designate the normal hook switch for a telephone set. Section 72a is normally closed when the telephone is on hook, and in this condition it is connected to provide a ground to lead 25 which connects to one of the microprocessor ports in FIG. 1. Sections 72b and 72c are normally open when the telephone is on hook, and when the receiver is lifted they connect phone lines 70 and 71 through to a varistor over voltage protection device 73 and a conventional rectifier bridge 74, which makes the phone circuit insensitive to interchanging the connection of phone line leads 70 and 71. The negative terminal of bridge 74 connects to signal ground at lead 75, and the positive output at lead 76 connects to a normally open relay contact 77. The other terminal of contact 77 connects to a coil 80a of the conventional telephone transformer. The other side of coil 80a connects to a branch of conductor 81.

Telephone transmitter 82 and receiver 83 both connect to conductor 81. The other side of receiver 83 connects to one contact of a normally open relay contact 84. The other contact connects to telephone coil 80b. A resistor 85 is connected in parallel across the contacts of relay contact 84. The other side of coil 80b connects through resistor 86 to conductor 81, and through capacitor 87 to lead 88. Resistor 86 and capacitor 87 are part of the conventional spike protection and filtering circuit, which also includes varistor 89 which connects between lead 88 and lead 81. Coil 80c connects between transmitter 82 and lead 88.

Coil 80d connects from coil 80c and transmitter 82 to the collector of a switching transistor 90. The emitter of transistor 90 connects to signal ground, and a Zener diode 91 is connected from emitter to collector of transistor 90 to serve as spike suppression for switching of current through coil 80d. Lead 13 from the microprocessor connects to the base of transistor 90 through current limiting resistor 92. Bias resistor connections to the positive supply and signal ground are also provided for the circuit of transistor 90.

A branch of conductor 81 connects through resistor 93 to the collector of a transistor 94, whose emitter connects to signal ground. Lead 14 from the microprocessor connects through a current limiting resistor 95 to the base of transistor 94. Biasing resistor connections to the positive voltage source and to ground are also provided.

A ring detection circuit is provided as follows. Resistors 400 and 401 connect respectively from telephone line leads 70 and 71 to either side of a resistor 402, one side of which connects to signal ground. One terminal of a neon bulb 403 connects to the junction of resistors 400 and 402. The other electrode of bulb 403 connects to the base of a transistor 404. A ground resistor 405 also connects to the base of the transistor, and its emitter connects to signal ground. The collector of transistor 404 connects to lead 11 to the microprocessor, and a load or pull-up resistor 406 connects to the positive voltage source.

Contact 77 is operated by a driver coil 410, which has a spike suppression diode 411 connected in parallel with it. One side of coil 410 connects to the positive voltage source, and the other side connects to the collector of a transistor 412, whose emitter connects to signal ground. The base of transistor 412 connects through a resistor 413 to lead 96 from a port of port expander 16 of FIG. 1. Power supply and ground resistors are also provided for the circuit of transistor 412.

Contact 84 is operated by a relay driver coil 420, one side of which connects to the positive voltage source, and the other side of which connects to the collector of a transistor 421. A suppression diode 422 is connected in parallel with coil 420. The emitter of transistor 421 connects to signal ground, and its base connects through resistor 423 to lead 97 from a port of expander 16. As in the case with the other switching transistors, bias resistors to the plus voltage and ground are provided for the circuit of transistor 421.

The collector of transistor 421 also connects through a resistor 428 to the base of a transistor 430, and from there through a resistor 429 to signal ground. The emitter of transistor 430 connects to ground, and its collector connects to a lead 431 which extends to FIG. 3. A branch of conductor 81 also extends to FIG. 3.

In FIG. 3, reference number 440 indicates an integrated circuit commercially available telephone tone generating circuit. A reference crystal 441 is connected to the appropriate terminals thereof. The eight program inputs connect to the eight ports of port expander 16 of FIG. 1 as indicated by reference number 98. The high tone and low tone outputs of circuit 440 connect through resistors 442 and 443 to a summing point at lead 444 which connects to the base of a transistor 445. A bias resistor 446 connects to ground. The emitter of transistor 445 connects through resistor 447 to ground, and the collector connects through a load resistor 448 to the positive source. The collector also couples through a capacitor 450 to the base of a transistor 451, whose base also connects through a bias resistor 452 to the positive source, and through resistor 453 to lead 431 from FIG. 2. Lead 431 also connects through a resistor 454 to the emitter of transistor 451. The collector of transistor 451 connects to a branch of lead 81.

A plurality of tone decoders 460-467 are provided. Five such decoders are shown, and any number can be provided as required for use with a given telephone switching system and in the embodiment described herein eight are utilized. As exemplified by tone decoder 460, each tone decoder is a phase lock loop detector integrated circuit. As is generally known, each phase lock loop can be tuned for a given center frequency and bandwidth by the design selection of the various capacitors and resistors which are connected to the terminals thereof provided for that purpose. The actual component selection depends upon the design of the phase lock loop circuit, as set forth in manufacturers' specification sheets. A potentiometer 470 is included in the tuning network for final adjustment of the frequency to which the device is responsive, and similar adjusting potentiometers are provided for the other detectors also.

In the preferred embodiment, tone decoder 460 is tuned to 350 hz, plus or minus 20 hz. Decoders 461, 462, and 463 are tuned to 440 hz, 480 hz, and 620 hz, each plus or minus 20 hz. These are the four most commonly used tones, and any number of other decoders can be provided as suggested by decoder 467, tuned to the frequency or frequencies required for use with a given type of telephone switch gear.

Tones from lead 81 are A-C coupled through capacitor 471 to an amplifier circuit which includes operational amplifier 472. Input resistor 473 connects from the capacitor to the inverting input, and the feedback path includes resistor 474 and adjustable potentiometer 475 which is used to adjust the gain of the circuit. A biasing and filtering network is also provided at the input of amplifier 472. The output of amplifier 472 connects to lead 480, branches of which connect to the tone inputs to each of the tone decoders. The output of the tone detectors 460-467 connect through leads 99a-88h to the ports of expander 18 indicated by reference number 99 in FIG. 1.

The lead from port 12 of microprocessor 10 connects in FIG. 3 through a resistor 489 to the base of a transistor 490. Resistor connections to the plus voltage source and ground are also provided, and the emitter of transistor 490 connects to signal ground. Its collector connects through a buzzer or other acoustic tone producing device 491 to the positive voltage source.

The circuitry of FIGS. 1, 2, and 3 operates, in conjunction with program control of a microprocessor as follows. A ring on the phone line is of sufficient voltage to fire neon bulb 403 and turn on transistor 404, thus supplying a ground to lead 11 which is transmitted to the microprocessor. Subsequently, the microprocessor causes activation of buzzer 491 by applying a logical high signal on lead 12 to turn on transistor 490.

Lifting of the receiver from the hook is sensed by switch 72a as a removal of the ground from lead 25. When this occurs, lead 25 (FIG. 1) goes positive by virtue of pull-up resistor 35, and this couples a positive going pulse through capacitor 26, turning on transistor 22. This causes lead 21, which is normally at a positive voltage by virtue of pull-up resistor 24, to go to ground potential, applying a ground to the reset input of the microprocessor. As explained below, this resets the program to the scan initiating point upon raising of the receiver.

The scanning of the keyboard switches 50 to detect closure thereof, and the energization of indicator LED's 65-68 have already been described. Depressing of a function key causes the microprocessor to branch into a portion of its program for the specific function, as explained below with respect to the flowcharts. Depressing a digit key in columns 54, 55, or 56 causes the microprocessor to send commands via ports 98 to expander 16 to tone generator 440. According to the inputs commanded, generator 440 generates the standard tone pair for the given digit and these are summed by the summing amplifier 445 for eventual coupling to lead 81 of the telephone circuit. At the same time that a tone is being generated, the microprocessor, under programmed control, momentarily provides a ground at port 97 of expander 16, to turn off transistor 421. Normally, as for example during conversation, transistor 421 is biased on, energizing driver coil 420 and closing contacts 84. When the base drive to transistor 421 is removed by grounding of lead 97, contacts 84 are opened which in effect inserts resistor 85 in series with receiver 83. This is for the purpose of reducing the sensitivity of the receiver during the generating and depositing of tone on the telephone line so as to prevent excessive perceived loudness at the receiver. As an added interlock feature, transistor 451 (FIG. 3) is not permitted to couple the generated tones to lead 81 unless transistor 430 (FIG. 2) is on to provide a ground for the circuit. Transistor 430 is held off when transistor 421 is on and contacts 84 are closed. When transistor 421 turns off, a small bias current is allowed to pass through coil 420 and resistors 428 and 429 to turn transistor 430 on, but this bias current is not sufficient to energize the relay, and contacts 84 are opened. With transistor 430 on, the tone at the collector of transistor 445 is coupled through transistor 451 to lead 81, from which it is eventually sent out the telephone line.

During reception of tones by the telephone set from the telephone equipment to which it is connected, the microprocessor sends signals on leads 13 and 14 to transistors 90 and 94 in FIG. 2. During normal use, for example during conversation, transistor 94 is off and transistor 90 is on. It has been found desirable to cut out transmitter 82 during reception of tone so as to eliminate the possibility that random acoustic noises in the room could be picked up by the transmitter and detected by one or more of the tone decoders. Since these circuits are fairly sensitive and fast acting, only a slight amount of noise present in the room at the critical frequency for even a short interval of time could cause a false detection indication. For that reason a ground is momentarily provided at lead 13 to turn off transistor 90, thus opening the circuit through coil 80*d* and transmitter 82. At the same time a ground or logical load signal is removed from lead 14, allowing transistor 94 to turn on. This places resistor 93 in the circuit from conductor 81 to ground, and this serves as a dummy load to replace the transmitter to keep the telephone line balanced. After the tones have been received, the signals to leads 13 and 14 return to normal, with transistor 90 on and transistor 94 off.

Tones transmitted from the telephone switching equipment are coupled through the telephone circuits to lead 81 to amplifier 472. The gain adjusting control 475 is adjusted to give the desired amount of amplitude for proper operation of the detectors. The detectors respond to tones within their tuned bandwidth by providing digital signals at their outputs which are conveyed to ports 99 of expander 18, and from there to the microprocessor.

While the receiver hand piece is off hook, the system can flash the hook switch by means of contact 77. In normal operation, a logical high is provided at lead 96 from a port of expander 16, allowing transistor 412 to be on to energize relay driver 410 and close contact 77. This permits normal conversation as well as tone sending and receiving through the phone circuits. For a flash hook signal, the microprocessor provides a ground at lead 96 for approximately 650 milliseconds, or such other time interval as required for a specific type of switch gear. This de-energizes relay driver 410 and opens contact 77 for the duration of the interval, after which it returns to its closed position. This has the same effect as flashing the on hook switch, for signalling the telephone switch gear to which the telephone set is connected.

For installation testing purposes, the LED indicators 65–68 can be used for final adjustment of the tone generators. This is accomplished by a separate program subroutine. Test points 31 and 32 may be shorted together by the person doing the adjustment, thus placing a ground on input T₁. The microprocessor then branches to a programmed subroutine which simply scans the first four tone detectors 460, 461, 462, and 463, and applies signals according to their outputs to LED's 65–68. In this mode of operation, if no tones are being received, none of the LED's will be on. If a 350 hz tone is being received, and provided that decoder 460 is adjusted properly, it will provide a signal and the computer will turn on LED 65. In like manner, the microprocessor energizes LED 66 when a tone is received by detector 461, and similarly LED's 67 and 68 are energized when tones are received by detectors 462 and 463 respectively.

For example, a normal dial tone comprises both a 350 hz and 440 hz signal. When the telephone set is installed, the receiver can be lifted from the hook, test point 31 and 32 shorted, and LED's 65 and 66 should light. LED's 67 and 68 should be off. If this is not the case, it indicates improper adjustment. Trimmer resistor 470 is then adjusted to light diode 65, and a similar adjustment is used on decoder 461 to light LED 66. The actual adjustment can be achieved by turning the adjusting resistor through the on zone for the LED, then backing off halfway so the decoder bandwidth will be centered on the received frequency. Test tones or busy and ringing signals can be applied to the phone line input for aligning the other tone decoders. After alignment is complete, the short between test points 31 and 32 is removed for normal phone operation.

Figure 5A:
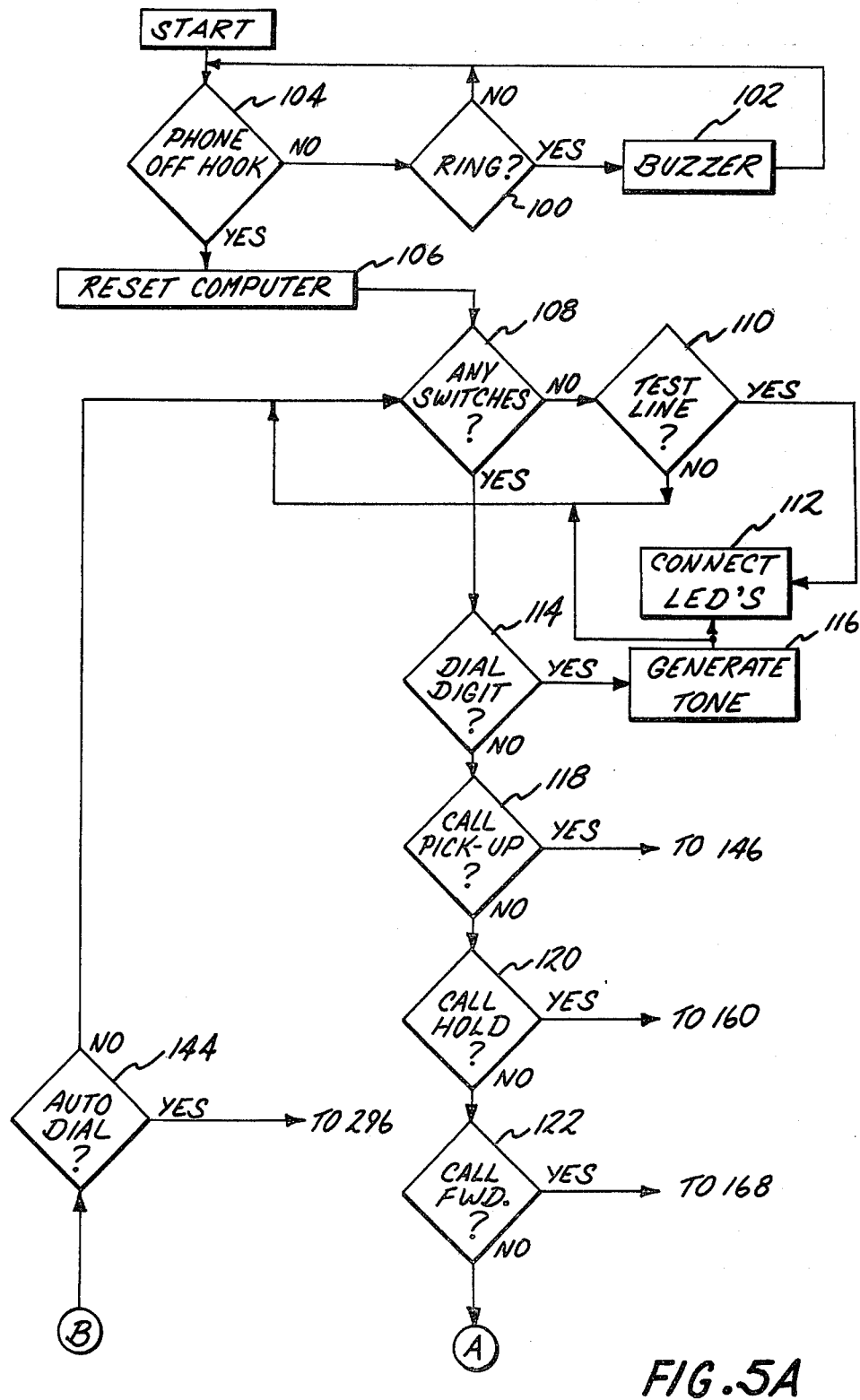
FIGS. 5A–5P are flow charts of the program of a microprocessor incorporated into the telephone set of the present invention.
Figure 5B:
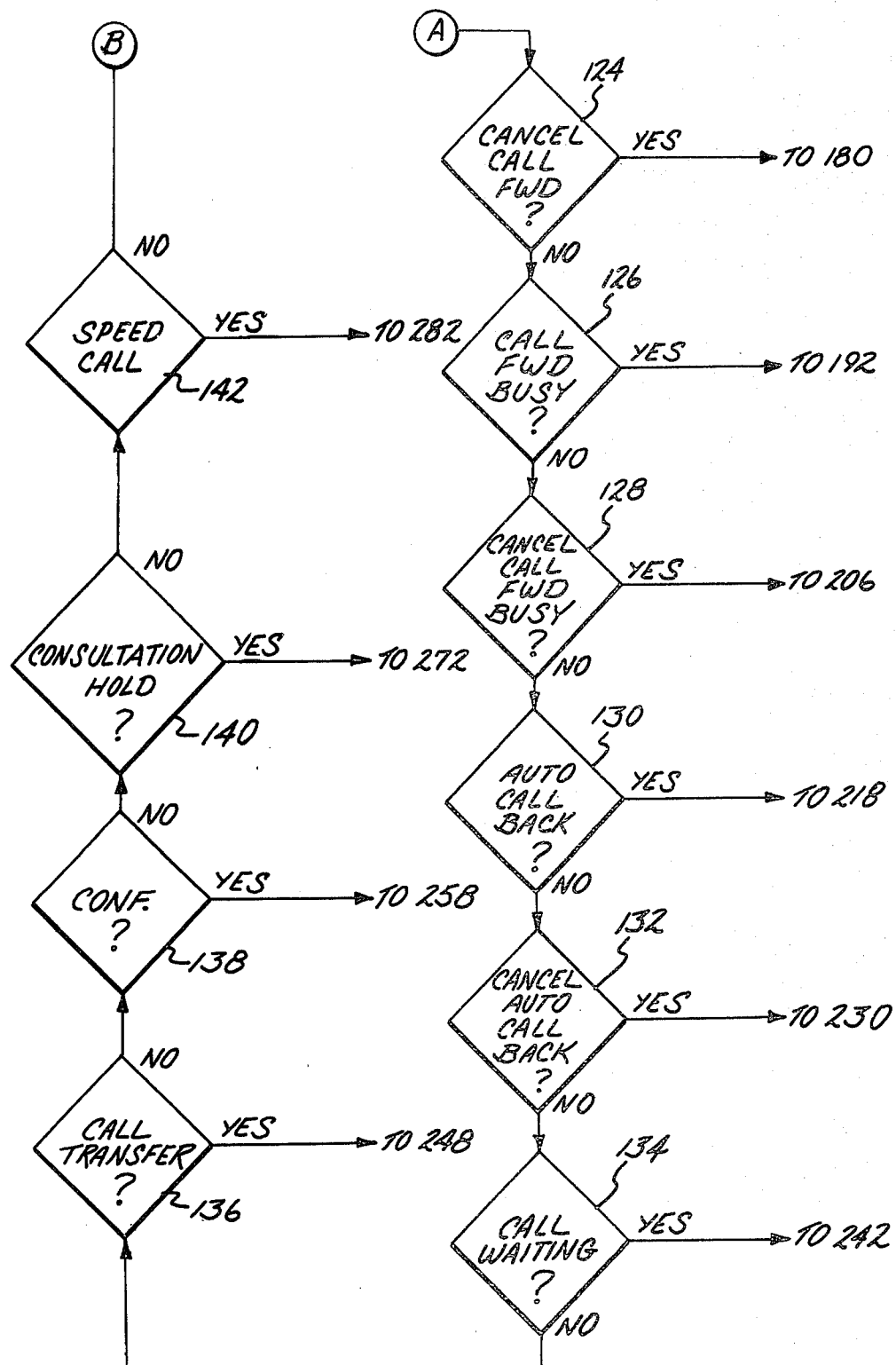

The operation of the telephone set will now be described with reference to the program flow charts shown in FIGS. 5A–5P. For the purpose of the present disclosure the program shown herein is compatible with the NEAX12 telephone switching gear manufactured by the Nippon Electric Corporation. It is understood, however, that the present invention may be compatible with any existing telephone switching gear having a memory and computing capability by appropriate modifications of the program in the telephone set microprocessor.

Steps 100, 102 and 104 are hardware implemented and do not form a part of the microprocessor program. However, for simplicity of explanation they are shown in FIG. 5A. It should be understood that the microprocessor program is initiated only when the phone is lifted off hook. Inquiry is made at step 104 as to whether or not the phone has been manually lifted off hook. If the relay at 104 is negative the program advances to step 100. At step 100 inquiry is made as to whether or not there is a ring signal present. If the response at step 100 is positive indicating that there is an incoming call desiring connection to the telephone set, the microprocessor generates a signal to activate buzzer 491 as shown at step 102. Once the phone is lifted off hook the incoming call is connected to the telephone and voice communication established. If the response at step 100 is negative, step 104 is repeated until the phone is lifted off hook.

If the reply at step 104 is positive the program proceeds to step 106 where microprocessor is reset to the first step of its program listing. Inquiry is then made at step 108 as to whether or not any of the keyboard switches have been manually actuated. If the response to step 108 is negative inquiry is then made at step 110 as to whether or not a test signal is present at input. A negative response at step 110 returns the program to step 108. A positive response to step 110 causes the microprocessor to generate test signals at step 112 to connect LED's 65–68 to tone decoders 460–463. Tests and recalibration of the phase lock loop circuits can then be performed as described above. Upon receipt of a positive reply at step 108 the program proceeds to step 114 where the keyboard switches are scanned to determine whether or not a digit switch has been actuated to initiate an outgoing call. If the response at step 114 is positive microprocessor 10 generates signals at step 116 that are applied to tone generator 440 which generates a tone corresponding to the dialed digit for transmission to the remote switch gear. If no digit switch has been depressed by the operator the program proceeds through steps 118–144 where the telephone keyboard is scanned to ascertain whether or not any of the function switches have been actuated. If none of the function switches have been actuated the program returns to step 108. If either one of the function switches has been actuated the program branches to the appropriate subroutines as will be described in more detail hereafter.

Figure 5C:
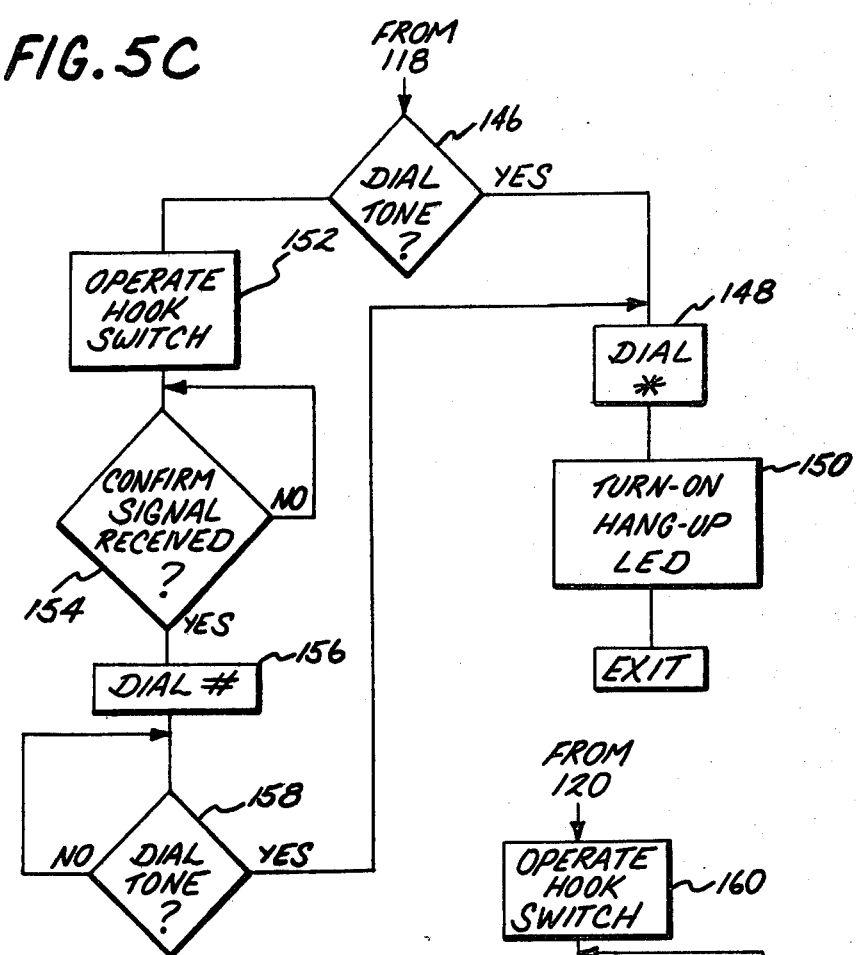

At step 118 a positive response indicates that the operator has actuated the call pick-up switch so the program branches to the subroutine shown in FIG. 5C beginning with step 146. The call pick-up function is utilized where the various individual telephone sets are operating in a night call mode whereby calls coming in from the switch gear ring a night bell and any individual telephone set may upon actuation of the call pick-up function be connected to the incoming call. The system is placed in the night call mode through appropriate input to the central telephone switch gear.

Upon depression of the call pick-up button microprocessor 10 also generates a signal to turn on the computing LED 65. For the sake of clarity this step is not shown in the flow chart since LED 65 remains on only for a momentary time interval until receipt of a coded tone signal from the switch gear. It should be understood also that in each of the other function modes LED 65 will be turned on upon depression of the function key. Again for the sake of clarity this particular step has been deleted from the program flow charts of each such function. Returning to FIG. 5C, at step 146 it is determined whether or not a dial tone is present. If a dial tone is present the program proceeds to step 148 where the microprocessor generates signals applied to the tone generator to initiate a coded tone signal, in the embodiment disclosed herein a tone signal corresponding to the star symbol or digit. Upon receipt of the star signal the switch gear connects the incoming call to the telephone set. At step 150 a signal is generated to turn on hang-up LED 66. If the operator desiring to utilize the call pick-up function is already on line talking to another party the inquiry at step 146 will be negative and the program will proceed to step 152 where the microprocessor generates a hook switch signal as described above with respect to the description of the circuitry. Upon receipt of the hook switch signal the switch gear will place the operator's present call on hold and a confirmation signal will be returned indicating receipt of the hook switch signal. At step 154 inquiry is made as to whether or not the confirmation signal has been received, the confirmation signal in this embodiment being a 480 HZ signal. If the response at 154 is negative step 154 is repeated until the appropriately tuned phase lock loop circuit detects the signal and generates a logic signal applied to an input of the microprocessor. Upon receipt of the confirmation signal the microprocessor generates a signal at step 156 which is applied to the tone generator circuit such that the tone generator circuit will generate a tone signal corresponding in this embodiment to the digit 14 or pound symbol. Upon receipt of the tone signal generated at step 156 the central switch gear places the operator's present call on hold and provides a dial tone. At step 158 inquiry is made as to whether or not a dial tone is received and once the dial tone is received the program proceeds to step 148 and then proceeds as previously described. Once the operator is finished with the incoming call he may then simply hang up the phone and his previous call which had been placed on hold will now be reconnected by the switch gear. The operator if he wishes may also utilize the call hold feature or the call transfer feature while dealing with the incoming call that he has picked up.

Figure 5D:
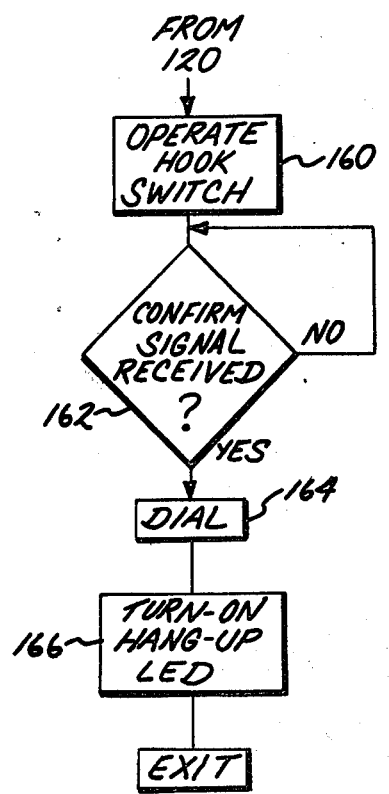

FIG. 5D illustrates the call hold function subroutine which branches from step 120 when activation of the call hold function is detected. From step 120 a positive reply advances the program to step 160 where the microprocessor generates a hook switch signal. Upon receipt of the hook switch signal at the switch gear a confirmation signal is generated. At step 162 inquiry is made as to whether or not the confirmation signal has been received which in the embodiment disclosed herein is a 480 HZ signal. Upon receipt of the confirmation signal the program proceeds to step 164 where the micrprocessor generates a signal applied to the tone generator circuit to generate a tone signal corresponding to the pound symbol or digit 14. When the central switch gear receives the pound symbol tone the call at the operator's telephone is placed on hold and at step 166 the hang-up LED is energized. To return to the call on hold the operator may simply hand up his phone and the central switch gear will reconnect the call on hold to his telephone.

If it is desired to forward calls from one telephone to another extension the call forward function is used by manual actuation of the call forward switch. If the response at step 122 is positive the program branches to the subroutine shown at FIG. 5C and step 168 where it is ascertained whether or not a dial tone is being received at the telephone. If the reply at 168 is negative a signal is generated at step 170 to flash or blink the completed LED indicating malfunction so that the operator can hang up the phone and try again. If a dial tone is present at step 108 the program advances to step 170 where the microprocessor generates a control signal applied to the tone generator so that the coded tone represented by the digit 55 is generated for transmission to the switch gear. At 172 manual LED 67 is turned on indicating to the operator that he may now dial in the extension to which he wishes his calls to be forwarded. Step 104 illustrates the operator's manual entry of the extension to which the calls are to be forwarded. The central switching system will enter the extension into its memory and generate a confirmation signal (in this embodiment a low tone 480 Hz/620 Hz signal) which is transmitted to the telephone. At step 176 it is determined whether or not the confirmation signal has been received. Once the confirmation signal is received the program proceeds to step 178 where programmed and hang-up LEDs 68 and 66 are turned on and the operator can then hang up the telephone. Programmed LED 68 will remain on until the program feature is cancelled and all calls will be forwarded by the central switching system to the desired extension.

FIG. 5H illustrates the subroutine for the cancellation of the call forward function. Upon depression of the cancel call forward button if the inquiry at step 128 is positive the program advances to step 180 where the presence or absence of a dial tone is determined. If no dial tone is received the program branches to step 182 whereby a control signal is generated to flash or blink a hang-up LED 66. Detection of a dial tone at step 180 advances the program to step 184 where the microprocessor generates control signals applied to the tone generator which in turn generates a coded tone signal corresponding to the digit 56. The coded tone signal is transmitted to the central switch gear which in turn generates a confirmation signal which in the present embodiment is a low tone 480 Hz/620 Hz signal. At step 186 the presence or absence of the confirmation signal is determined and upon receipt thereof the program proceeds to 188 where the microprocessor generates a signal to turn off programmed LED 68 and at step 190 a signal is generated to turn on or energize hang-up LED 66. When the operator receives the visual indication provided by the illumination of the hang-up LED he may then hang up the telephone with the call forward function terminated.

In some instances the operator may wish to have incoming calls forwarded to another extension, for example another telephone at his same work station or to a more remote station, in the event that he is already on line with another call. The operator would therefore actuate the call forward busy button and the reply at step 126 would be positive branching the program to the subroutine shown in FIG. 5E. Specifically, from step 126 the program advances to step 192 where inquiry is made as to whether or not a dial tone is present. A negative reply at step 192 advances the program to step 194 where the microprocessor generates control signals to cause a flashing or blinking hang-up LED 66. If a dial tone is present at step 192 the program proceeds to step 196 where the microprocessor generates control signals that are applied to the tone generator which in turn generates a coded tone signal corresponding to the numeral or digit 53 and the coded tone signal is transmitted to the telephone switch gear. At step 198 manual LED 67 is turned on providing the operator with a visual indication that he may now enter the extension to which he wishes calls to be transferred. Step 200 illustrates the operator manually dialing the appropriate extension. Upon receipt of the manually dialed extension the telephone switch gear generates a confirmation signal (high tone 480 Hz/620 Hz signal) which is transmitted to the telephone. At step 202 the confirmation signal is detected by the tone decoders and the program advances to step 204 where signals are generated to turn on programmed LED 68 and the hang-up LED 66. The operator can then hang up his telephone and if he receives a call while he is on line with a prior call, the subsequent call will be automatically forwarded to the programmed extension by the central switch gear.

Figures 5E, 5F:
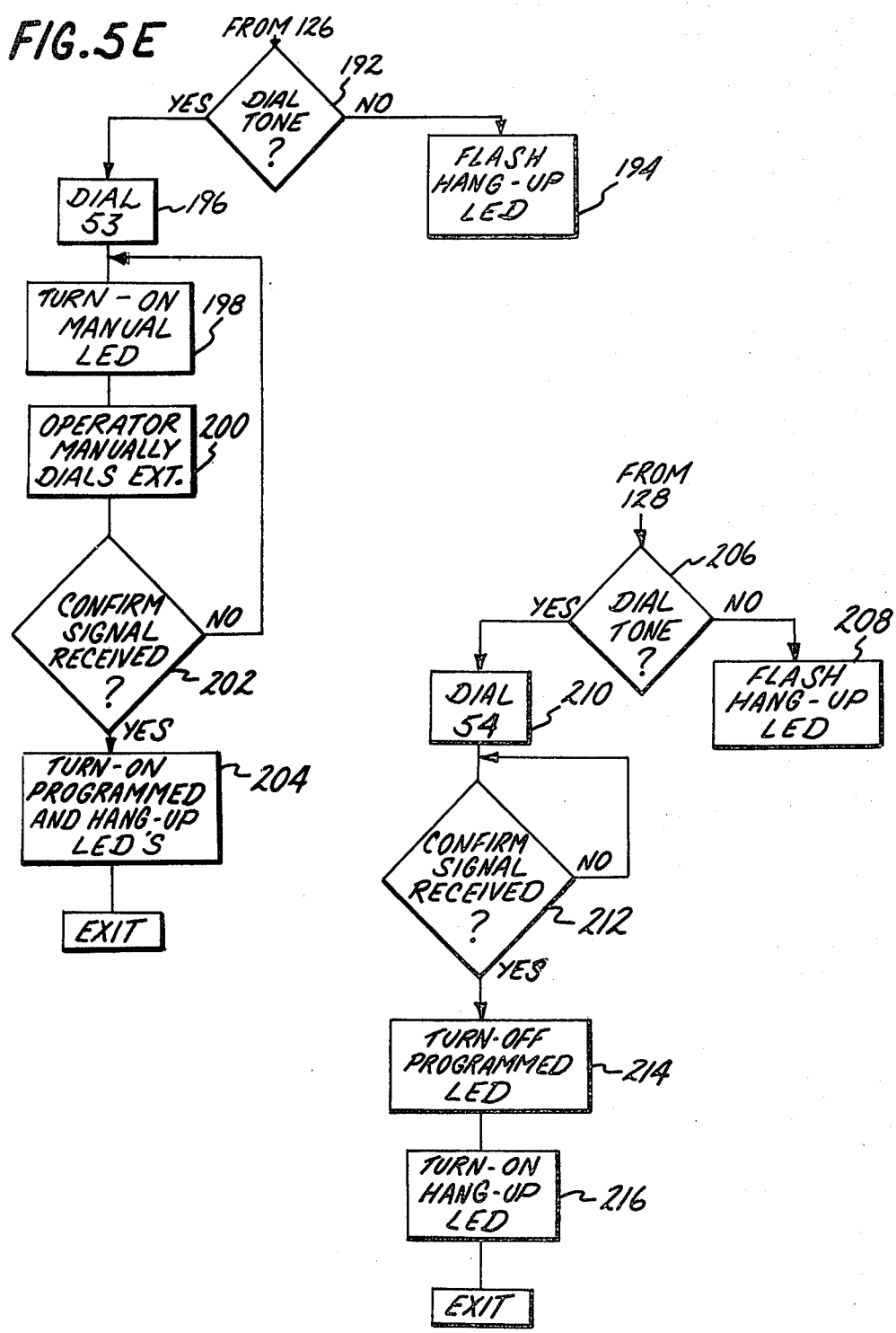

FIG. 5F illustrates the subprogram subroutine for the cancellation of the call forward busy function. When the operator manually actuates the cancel forward busy switch the reply at step 128 is positive and the subroutine proceeds at step 206 to ascertain the presence of absence of a dial tone. Here again if the reply at 206 is negative the microprocessor generates signals at step 208 to flash or blink hang-up LED 66 alerting the operator of a possible malfunction. Upon receipt of a dial tone at step 206 the program advances to step 210 where the microprocessor generates control signals that are forwarded to the tone generator which generates a coded tone corresponding to digit 54 in this embodiment and the coded tone signal is transmitted to the central switch gear. Upon receipt of the coded tone signal indicating cancellation of the forward busy function the central switching system generates a confirmation signal (low tone 480 Hz/620 Hz). At step 212 the presence of absence of the confirmation signal is determined and upon receipt of the confirmation signal the program proceeds to step 214 whereby programmed LED 68 is turned off and at step 216 the hang-up LED 66 is turned on. The operator can then hang up the phone and the call forward busy function is terminated.

Another function which is a feature of the present invention is the automatic call back. The operator may utilize this feature when he has initiated a call and encounters a busy signal. By actuating the automatic call back button the switching system is programmed to redial the desired number when it becomes free. The automatic call back subroutine is shown in FIG. 5J and at step 130 a positive reply branches the program to the subroutine and in particular to step 218. At step 218 the presence or absence of a busy signal is determined. If for some reason the busy signal is absent the program proceeds to step 220 where the presence or absence of a dial tone is ascertained. If a dial tone is present at step 220 a signal is generated at step 222 to flash or blink hang-up LED 66 indicating system malfunction. If the reply at step 220 is negative the program returns to step 218. Upon encountering a busy signal at step 218 the program advances to step 224 where the microprocessor generates a control signal applied to the tone generator to generate a coded tone signal corresponding to digit 5. The coded tone signal is transmitted to the switch gear which in turn generates and transmits to the telephone a confirmation tone (low tone 480 Hz/620 Hz). At step 226 the confirmation tone is detected and a positive reply at step 226 advances the program to step 228 where the programmed LED and completed LED are turned on and the operator may then hang up the telephone. When the line of the party to whom the operator directed his original call becomes available the switching system will automatically redial the number and connect the dialed number to the operator's telephone.

If the operator subsequently wishes to cancel the automatic call back function he manually actuates the cancel automatic call back button and a positive response will be received at step 132. The program then branches to the subroutine shown in FIG. 5J, specifically to step 230 where the presence or absence of a dial tone is monitored. A negative reply at step 230 advances the program to step 232 where signals are generated to flash or blink the hang-up LED 66. With a positive response at step 230 the program proceeds to step 234 where the microprocessor generates control signals applied to the tone generator which in turn generates a coded tone signal corresponding to the digit 58. The coded tone signal is transmitted to the switch gear and upon receipt thereof the switching system generates and returns a confirmation tone signal (low tone 480 Hz/620 Hz). At step 236 the presence or absence of a confirmation tone signal is determined. Upon receipt of the confirmation tone the program advances to step 238 where signals are generated to turn off programmed LED 68 and then the step 240 where signals are generated to turn on the hang-up LED 66. The operator can then hang up the phone and the programmed automatic call back function will be deactivated.

With the operator on the line with another call and a second call comes in to his extension in the present invention the operator will hear a short burst or tone signal. He may wish to place the call that is in progress on hold to receive the incoming call. If this is the case in the present invention the operator will manually depress the call waiting button and a positive reply will be generated at 134. The program branches to subroutine shown in FIG. 5K and in particular to step 242 where the microprocessor generates a hook switch signal. Upon receipt of the hook switch signal at the switch gear, a confirmation tone (480 Hz tone) is generated. At step 244 the presence or absence of the confirmation tone is detected at the telephone. Upon receipt of the confirmation tone the program proceeds to step 246 where the microprocessor generates signals supplied to the tone generator which in turn generates a coded tone corresponding to the pound symbol or digit 14. This coded tone signal is transmitted to the switch gear and the ongoing call is placed on hold and the incoming call is automatically connected to the operator's telephone. The operator may alternate between calls by using the call hold function or may transfer either call utilizing the call transfer function.

Figures 5K, 5L:
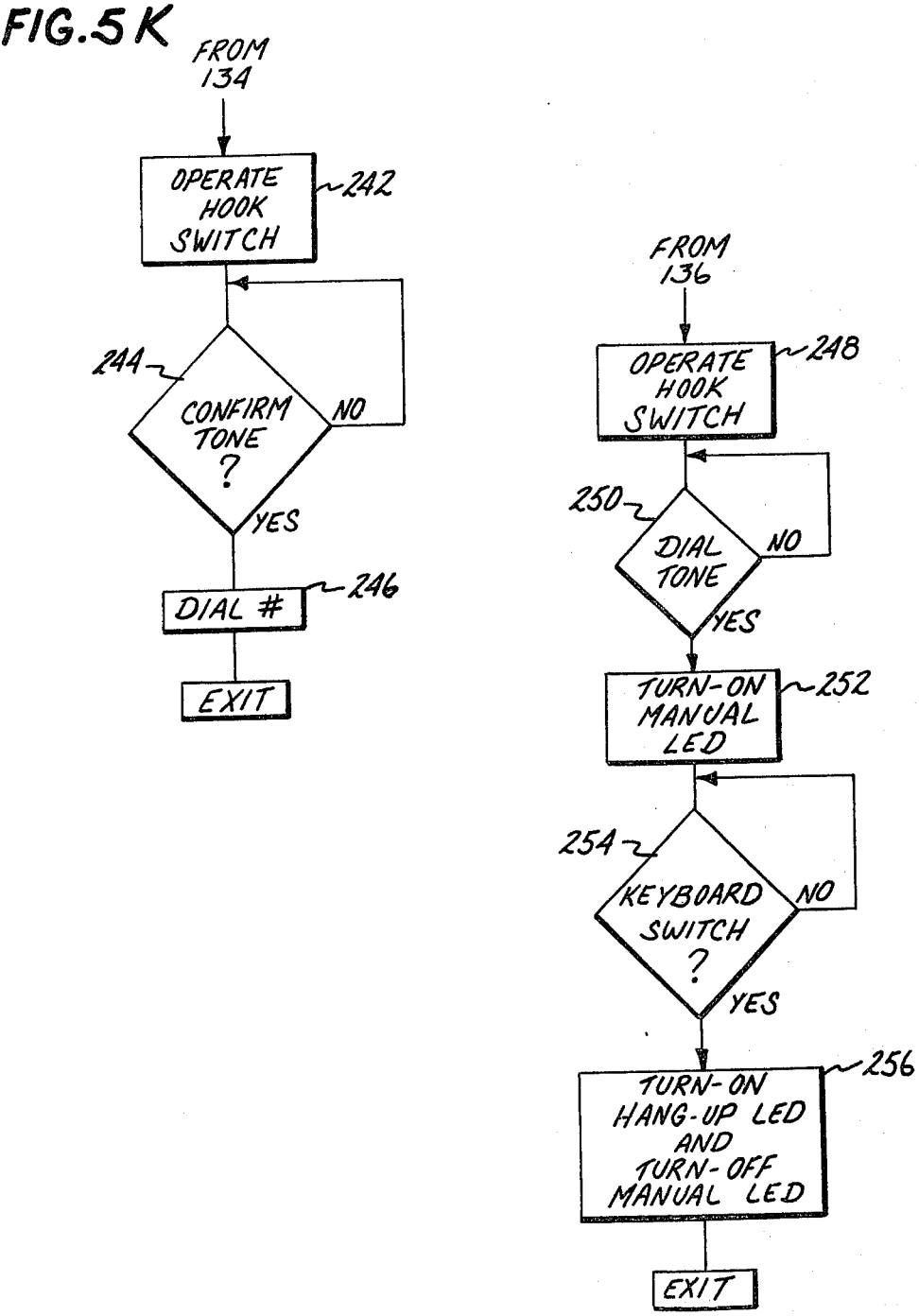

The call transfer function is shown in the subroutine illustrated in FIG. 5L and is utilized when the operator wishes to transfer a call that he has on line to another extension. Upon manual actuation of the call transfer button the reply in step 136 is positive and the program branches to the subroutine beginning with step 248 where the microprocessor generates a hook switch signal. The hook switch signal is transmitted to the switch gear which provides a dial tone to the telephone. At step 250 the presence or absence of a dial tone is ascertained. A positive response at step 250 indicating the presence of a dial tone advances the program to step 252 whereby signals are generated to turn on the manual LED 67 indicating to the operator that he may enter the desired extension to which he wished the call transferred. The call meanwhile has been placed on hold by the switch gear. At step 254 it is determined whether or not any of the keyboard digits have been actuated and upon a positive indication that at least one such digit has been actuated the program proceeds to step 256 where signals are generated to turn hang-up LED 66 and turn off manual LED 67. When the extension to which the operator desires a transfer answers, the operator may announce the call and hang up whereby the call will automatically be connected by the switch gear to the transferred extension. If the called extension is busy the operator simply depresses the call transfer button and is reconnected by the switch gear to the original call.

Figure 5M:
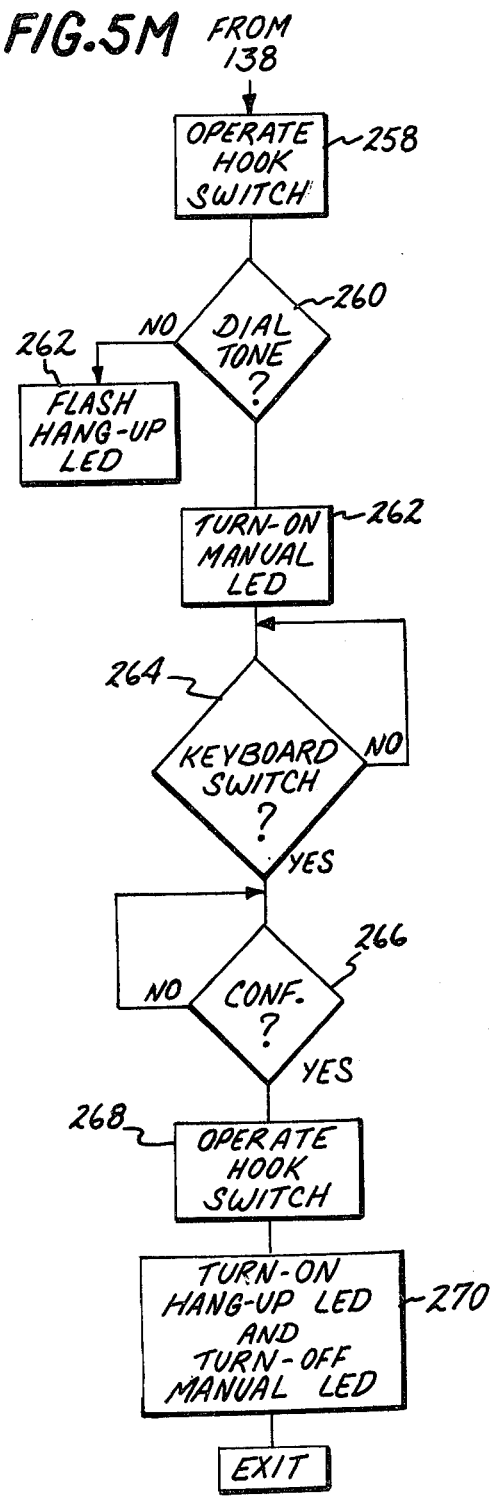

A conference call function is included and is shown as a subroutine in FIG. 5M. In utilizing the conference call mode the operator may wish to establish a conference call with more than two parties. The operator is initially on line with one party and upon actuation of the conference button the reply at step 138 is positive and the program branches to the subroutine FIG. 5M. At step 258 the microprocessor generates a hook switch signal. The hook switch signal is received by the switch gear which connects the telephone to the dial tone and places and the original call on hold. At step 260 the presence or absence of the dial tone is detected and if no dial tone is received at step 262 hang-up LED 66 is actuated in the flashing or blinking mode. Upon receipt of a dial tone at step 260 the program proceeds to step 262 whereby manual LED 67 is turned on indicating to the operator that he may dial the desired extension. At step 262 inquiry is made as to whether or not at least one keyboard digit has been manually actuated. When at least one such digit has been actuated the program proceeds to step 266. When the dialed extension responds to operator announces his wish to establish a conference call and may then manually actuate the conference button once again. At step 266 it is determined whether or not the conference button has been actuated and upon receipt of a positive reply the microprocessor generates a hook switch signal at 268. The hook switch signal generated at 268 is transmitted to the switch gear which automatically establishes three-way communication between the operator and the two other parties in a conference call. The program proceeds to step 270 where hang-up LED 66 is turned on and manual LED 67 is turned off.

Figure 5N:
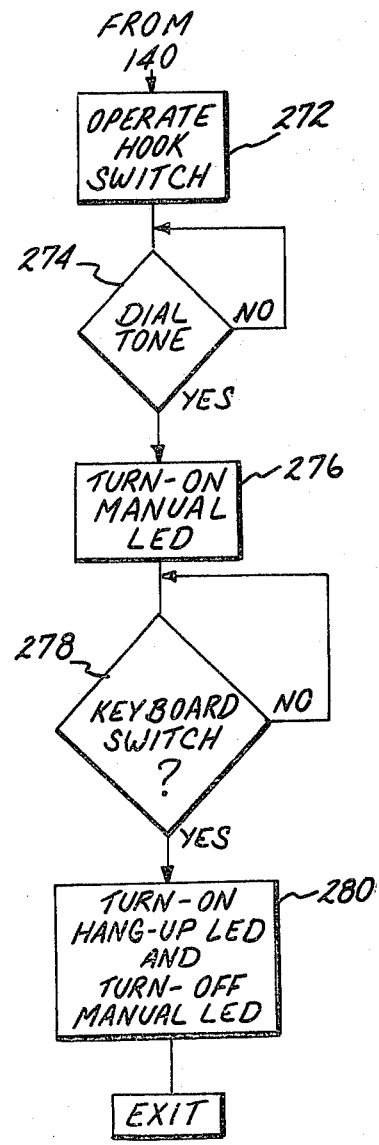
Figure 5:
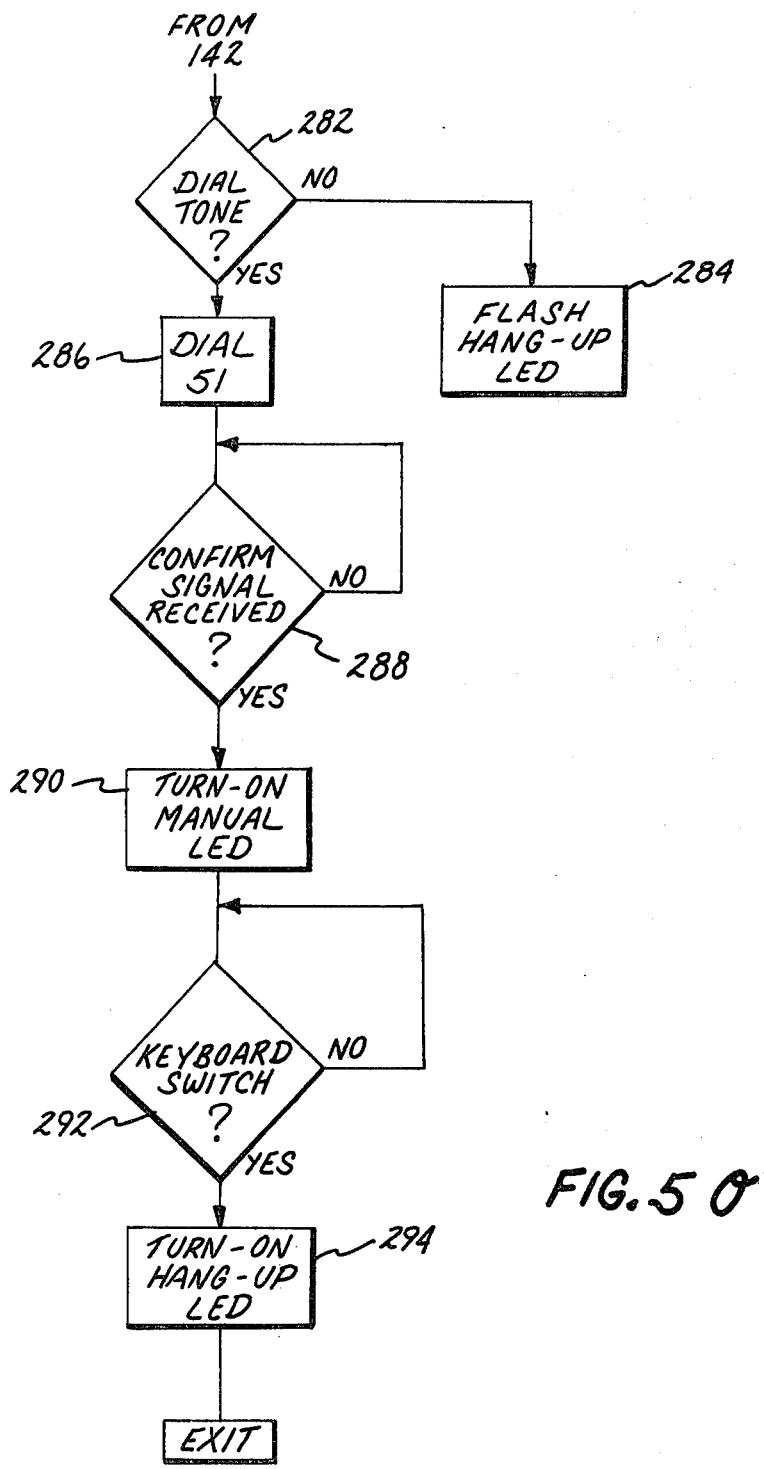
Figure 5P:
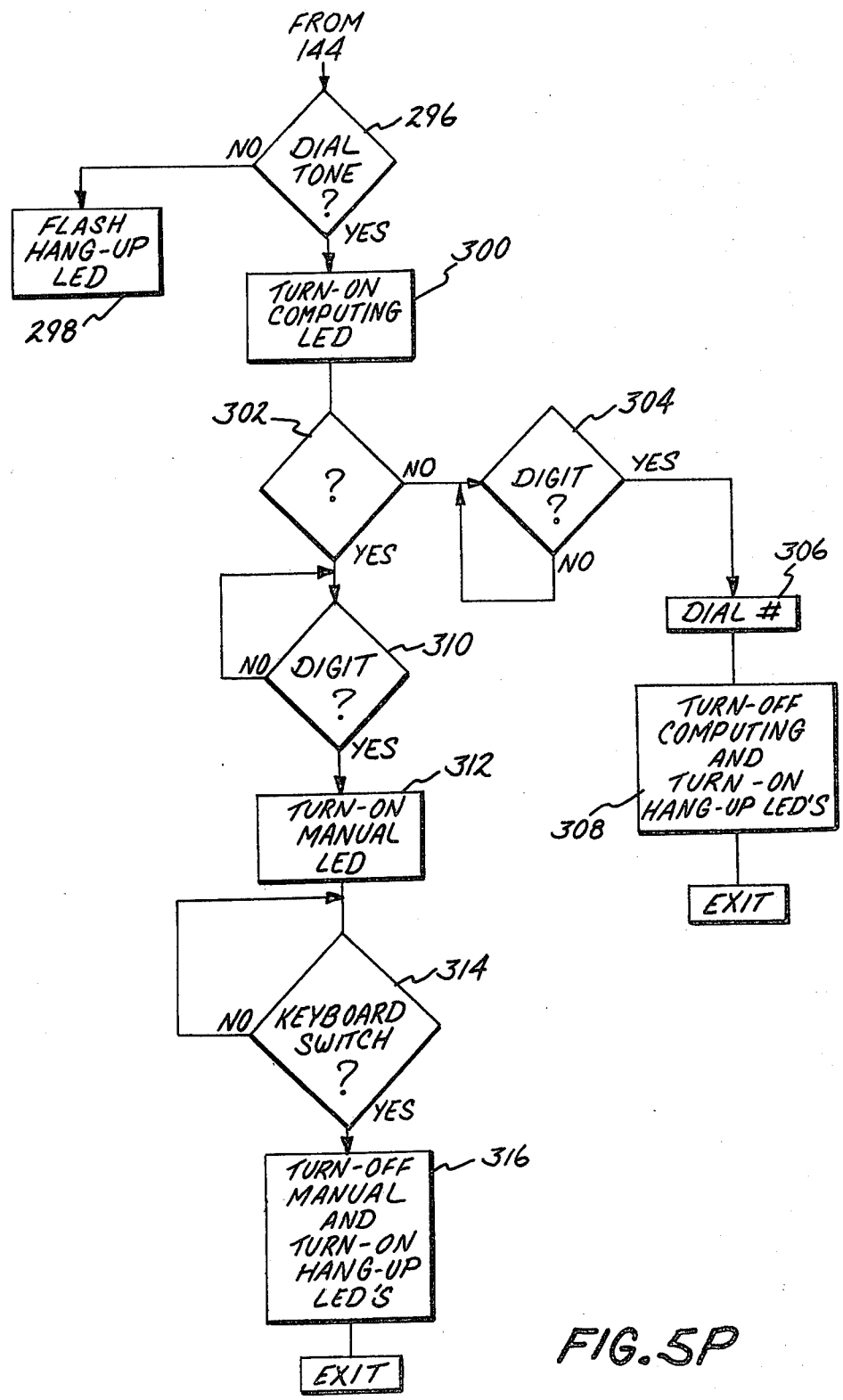

The operator may in some circumstances simply wish to consult with another party and will therefore wish to utilize the consultation hold function. Upon actuation of the consultation button the reply at step 140 is positive and the program branches to the subroutine shown in FIG. 5N. At step 272 the microprocessor generates a hook switch signal. The hook switch signal is transmitted to the switch gear and the switch gear places the present call on hold and provides a dial tone. At step 274 the presence or absence of the dial tone is determined. Upon receipt of the dial tone in step 274 the program proceeds to step 276 where signals are generated to turn on manual LED 67 providing an indication that the operator may enter the desired extension of the party with whom he wishes to consult. At step 278 inquiry is made as to whether or not at least one keyboard digit switch has been actuated. Upon entry of the extension the desired extension is called. After the operator completes his consultation and the party with whom he has consulted hangs up the switch gear will automatically reconnect the operator to his original call. Following step 278 the program will advance the step 280 whereby signals are generated to turn on hang-up LED 66 and turn off the manual LED 67. In the event that the called extension is busy or the operator receives no answer he simply manually depresses the consultation hold button causing the microprocessor to generate a hook switch signal and upon receipt of this hook switch signal the switch gear will reconnect the operator to his original call.

Some businesses or other organizations serviced by a switch gear of the type compatible with the telephone disclosed herein may have occasion to deal with frequently called numbers. Such frequently called numbers can be programmed into the memory of the switch gear. The operators at each individual extension within the business organization can then be provided with an abbreviated call number for each such frequent number. The call number may be, for example, a two or three digit number. If an operator wishes to utilize the speed call function he simply presses the speed call button and a positive reply is received at step 142. The program then branches to the subroutine shown in FIG. 5O. At step 282 it is determined whether or not there is a dial tone. If there is no dial tone the program advances to step 284 whereby hang-up LED 66 is flashed or blinked to indicate malfunction. Upon receipt of a dial tone at step 282 the program proceeds to step 286 whereby the microprocessor generates a control signal which is applied to the tone generator in turn responds to the control signals to generate a coded tone signal, in this case corresponding to the digits 51, and the coded tone signal is transmitted to the switch gear. At step 288 to microprocessor waits for receipt of a confirmation signal from the switch gear. Upon receipt of the confirmation signal, the program proceeds to step 290 where the microprocessor generates control signals to turn on manual LED 67. The operator then has a visual indication that he may enter the abbreviated call number corresponding to the frequently number of his selection. At step 292 it is determined whether or not at least one digit button has been depressed. A positive response at step 292 advances the program to step 294 where the microprocessor generates signals to turn on hang-up LED 66. The abbreviated three digit call number is received by the switch gear and the complete call number is automatically dialed.

The present invention also has the capability of storing a number of frequently called numbers at the telephone itself in the memory of the microprocessor. In some businesses, it may be desirable to have certain secured numbers that are capable of utilization by limited individuals. For example, in the banking business it may be desirable to have only limited access to numbers that enable personnel to transfer funds by telephone.

These secured numbers can therefore be stored in the microprocessor of the telephone set and only the extension at which the number is stored has access to the secured number. If the operator wishes to utilize the auto dial function he will manually actuate the auto dial button and the reply at step 144 of the program is positive. The program then branches to the subroutines shown in FIG. 5P. At step 296 inquiry is made as to whether or not a dial tone is present on the line. If a dial tone is absent this program advances to step 298 whereby hang-up LED 66 is activated in the blinking or flashing mode. A positive reply at step 296 advances the program to step 300 where the microprocessor generates a signal to turn on the computing LED 65 indicating to the operator that the telephone is ready for operation in the autodial mode. If the generator wishes to enter a number in the memory of the microprocessor he will then manually actuate the pound symbol button. If he wishes to simply dial a number that is already in the memory he will actuate a digit button or buttons corresponding to the number that he wishes to dial. In the embodiment disclosed herein the microprocessor memory may accommodate fourteen 11-digit numbers and to dial one of the numbers the operator simply enters the digit 1-14 corresponding to the number he wishes to call. At step 302, therefore, inquiry is made as to whether or not the pound symbol switch has been actuated. If the reply is negative the program proceeds to step 304 where it is ascertained whether or not a digit switch has been manually actuated by the operator. When the reply at step 304 is positive the program proceeds to step 206 whereby the microprocessor generates control signals to automatically dial the number corresponding to the digits selected by the operator. The program then proceeds to step 308 whereby signals are generated to turn off the computing LED and turn on hang-up LED 66.

Returning the step 302, with a positive reply indicating that the operator wishes to program a new number into the microprocessor memory, the program proceeds to step 310. At step 310 it is determined whether or not the operator has entered a digit which corresponds to a particular memory location in the microprocessor. As stated previously, in the embodiment disclosed herein the operator can select any one of fourteen storage locations. Upon receipt of a positive response at step 310 the program advances the step 312 where the microprocessor generates a signal to turn on manual LED 67. The operator is now provided with a visual indication that he may enter the desired number into the selected memory storage location. At step 314 it is determined whether or not at least one digit switch has been actuated. Upon receipt of a positive reply at step 314 the program proceeds to step 316 where the microprocessor again generates control signals to turn off manual LED 67 and turn on hang-up LED 66. After entry of a number into the microprocessor memory the operator may hang up the telephone. If he wishes to enter another number into the microprocessor memory he must again lift the telephone off the hook and actuate the autodial function key.

The following is a program listing of the microprocessor program in accordance with one embodiment of the present invention described herein for the purpose of illustration. This program is for use with a microprocessor manufactured by Intel Corp. and having the designation 8748. It will be understood that alternative microprocessors could be utilized in accordance with the present invention and that the program may necessarily be modified.

| LOC | OBJ | LINE | | SOURCE STATEMENT | | |
|-----|-----|------|---|------|------|------|
| 0000 | | 1 | | ORG | 0 | |
| 0000 | BE00 | 2 | | MOV | R6,#0 | ;CLEAR CALL TRANSFER REGISTER |
| 0002 | 042E | 3 | | JMP | START | ;POWER UP-RESET START |
| | | 4 ;* BELL-RINGER LOGIC * | | | | |
| 0004 | 3477 | 5 BELL: | | CALL | OFFLED | ;LED OFF STUFF |
| 0006 | 09 | 6 | | IN | A,P1 | ;READ RING INDICATOR STATUS |
| 0007 | 5204 | 7 | | JB2 | BELL | |
| 0009 | BB02 | 8 | | MOV | R3,#2 | ;SET BUZZER TO 2 BUZZES |
| 000B | 230E | 9 BELL 0: | | MOV | A,#0EH | ;SET SPEAKER ON |
| 000D | 39 | 10 | | OUTL | P1,A | |
| 000E | BA41 | 11 | | MOV | R2,#65 | ;RING ON TIME (650 MS) |
| 0010 | 14AC | 12 | | CALL | DELAY | |
| 0012 | 2306 | 13 | | MOV | A,#6 | ;SET SPEAKER OFF |
| 0014 | 39 | 14 | | OUTL | P1,A | |
| 0015 | BA14 | 15 | | MOV | R2,#20 | ;RING OFF TIME (650 MS) |
| 0017 | 14AC | 16 | | CALL | DELAY | |
| 0019 | EB0B | 17 | | DJNZ | R3,BELL0 | |
| 001B | BA64 | 18 BELL 1: | | MOV | R2,#100 | ;SET TIME TO 1SECOND |
| 001D | 23D7 | 19 BELL 2: | | MOV | A,#0D7H | ;10 MS DELAY |
| 001F | 62 | 20 | | MOV | T,A | |
| 0020 | 55 | 21 | | STRT | T | ;START TIMERS |
| 0021 | 1629 | 22 BELL 3: | | JTF | BELL4 | ;10 MS EXPIRED |
| 0023 | 09 | 23 | | IN | A,P1 | ;READ RING INDICATOR |
| 0024 | 37 | 24 | | CPL | A | ;CHECK FOR RING OFF |
| 0025 | 521B | 25 | | JB2 | BELL 1 | ;STILL RINGING RESET TIMER |
| 0027 | 0421 | 26 | | JMP | BELL 3 | ;NO RING KEEP ON TIMMING OUT |

```
0029  EA1D    27 BELL 4:          DJNZ    R2,BELL@    ;WAIT FOR COMPLETE TIME OUT
002B  65      28                  STOP    TCNT        ;STOP TIMMER
002C  0404    29                  JMP     BELL        ;WAIT FOR NEXT RING CYCL
002E  2306    30 START:           MOV     A,#6H       ;TURN SPEAKER OFF MICROPHONE ON
0030  39      31                  OUTL    P1,A
0031  14A6    32                  CALL    NTONE       ;TURN TONE GENERATORS OFF
0033  2604    33                  JNT0    BELL        ;HOOK SWITCH = HANG UP
0035  563A    34                  JT1     STAR1       ;TEST INPUT 1
0037  14E2    35                  CALL    TCODE       ;READ TONE DECODERS
0039  3D      36                  MOVD    P5,A        ;OUTPUT DATA TO LED's ON KEYBOARD
003A  14B8    37 STAR1:           CALL    KBRD
003C  E62E    38                  JNC     START       ;NO KEYS PUSHED
003E  23F4    39                  MOV     A,#-12
0040  6B      40                  ADD     A,R3        ;ADD KEYBORD KEY VALUE
0041  F65F    41                  JC      FUNCT       ;FUNCTION KEY (NO DIAL)
              42 ;******
              43 ; DIAL DIGITS
              44 ;******
0043  1451    45                  CALL    CODE        ;GET TONE CODE FOR DIGIT PUSHED
0045  342D    46                  CALL    TONE        ;TURN ON TONE GENERATOR
0047  2604    47 DIAL1:           JNT0    BELL        ;HOOK SWITCH = HANG UP
0049  14B8    48                  CALL    KBRD
004B  F647    49                  JC      DIAL 1      ;KEY STILL PRESSED
004D  14A6    50                  CALL    NTONE       ;TURN OFF TONE GENERATOR
004F  042E    51                  JMP     START
0051  BDBF    52 CODE:            MOV     R5,#0BFH    ;COLUMN VALUE
0053  BCFE    53 CODE 1:          MOV     R4,#0FEH    ;ROW VALUE
0055  FB      54 CODE 2:          MOV     A,R3        ;KEYBOARD SWITCH VALUE
0056  C665    55                  JZ      CODE3       ;PROPER ROW & COLUMN TONE FOR THIS DIGIT
0058  CB      56                  DEC     R3          ;DECREMENT KEYBOARD DATA
0059  FC      57                  MOV     A,R4
005A  E7      58                  RL      A           ;ROTATE ROW VALUE LEFT
005B  AC      59                  MOV     R4,A
005C  5310    60                  ANL     A,#10H      ;4 SHIFTS CHECK
005E  9655    61                  JNZ     CODE2
0060  FD      62                  MOV     A,R5
0061  77      63                  RR      A           ;ROTATE COLUMN VALUE RIGHT
0062  AD      64                  MOV     R5,A
0063  0453    65                  JMP     CODE1
0065  FD      66 CODE 3:          MOV     A,R5
0066  53F0    67                  ANL     A,#0F0H     ;MASK FOR COLUMN VALUE
0068  AD      68                  MOV     R5,A
0069  FC      69                  MOV     A,R4
006A  530F    70                  ANL     A,#0FH      ;MASK FOR ROW VALUE
006C  6D      71                  ADD     A,R5
006D  AB      72                  MOV     R3,A        ;PROPER ENCODED COLUMN AND ROW
              73                                      ;VALUE FOR TONE GENERATOR
006E  83      74                  RET
              75 ;******
006F  AB      76 FUNCT:           MOV     R3,A        ;SAVE DATA
0070  23D0    77                  MOV     A,#0D0H
0072  3A      78                  OUTL    P2,A        ;CHIP SELECT
0073  230E    79                  MOV     A,#0EH
0075  9D      80                  ANLD    P5,A        ;TURN ON FUNCTION LED
0076  FB      81                  MOV     A,R3        ;RESTORE DATA
0077  037A    82                  ADD     A,#FCTNT+1
0079  B3      83 FCTNT:           JMPP    @A          ;JUMP INTO DECODE TABLE
007A  86      84                  DB      F01         ;FUNCTION 1 KEY
007B  88      85                  DB      F02         ;         2 KEY
007C  8A      86                  DB      F03         ;         3 KEY
007D  8C      87                  DB      F04         ;         4 KEY
007E  8E      88                  DB      F05         ;         5 KEY
007F  90      89                  DB      F06         ;         6 KEY
```

```
0080  92        90              DB    F07      ;           7 KEY
0081  94        91              DB    F08      ;           8 KEY
0082  96        92              DB    F09      ;           9 KEY
0083  98        93              DB    F10      ;          10 KEY
0084  9A        94              DB    F11      ;          11 KEY
0085  9C        95              DB    F12      ;          12 KEY
0086  2400      96  F01:        JMP   TRANS    ;TRANSFER CALL
0088  2438      97  F02:        JMP   ADDON    ;ADD-ON CONFERENCE
008A  243A      98  F03:        JMP   CONSLT   ;CONSOLTATION HOLD
008C  2448      99  F04:        JMP   HOLD     ;CALL HOLD
008E  44A2     100  F05:        JMP   WAITG    ;CALL WAITING
0090  2485     101  F06:        JMP   PICKUP   ;CALL PICKUP
0092  4473     102  F07:        JMP   AUTOCL   ;AUTOMATIC CALL BACK
0094  6400     103  F08:        JMP   BOOK     ;PHONE BOOK DIRECTORY
0096  44A4     104  F09:        JMP   SPEED    ;SPEED CALL
0098  24B9     105  F10:        JMP   FORALL   ;FORWARD ALL CALLS
009A  444B     106  F11:        JMP   FORBZY   ;FORWARD BUSY CALLS
009C  44BA     107  F12:        JMP   CANCEL   ;CANCEL FUNCTIONS PROGRA-
                                                MMED
                 108  ;******
009E  23E0     109  XTONE:      MOV   A,#0E0H
00A0  3A       110              OUTL  P2,A     ;CHIP SELECT
00A1  23FF     111              MOV   A,#0FFH
00A3  3F       112              MOVD  P7,A     ;TURN TONE GENERATOR OFF
00A4  3E       113              MOVD  P6,A
00A5  83       114              RET
00A6  149E     115  NTONE:      CALL  XTONE    ;TURN TONE OFF
00A8  230C     116              MOV   A,#0CH
00AA  3D       117              MOVD  P5,A     ;HOOK ON, DIAL OFF
00AB  83       118              RET
00AC  23D7     119  DELAY:      MOV   A,#0D7H  ;TIME COUNTER FOR 10 MS
                                                DELAY
00AE  62       120              MOV   T,A
00AF  55       121              STRT  T        ;START TIMER
00B0  16B4     122  DELA1:      JTF   DELA2
00B2  04B0     123              JMP   DELA1
00B4  EAAC     124  DELA2:      DJNZ  R2,DELAY ;DECREMENT 10MS COUNTER
00B6  65       125              STOP  TCNT     ;STOP TIMER
00B7  83       126              RET
00B8  BD02     127  KBRD:       MOV   R5,#2    ;SET REG 5
00BA  27       128              CLR   A
00BB  AC       129              MOV   R4,A
00BC  AB       130              MOV   R3,A     ;CLR REG 3 & 4
00BD  23E0     131  KBRD1:      MOV   A,#0E0H
00BF  3A       132              OUTL  P2,A     ;SET CHIP SELECT
00C0  230C     133              MOV   A,#0CH
00C2  9D       134              ANLD  P5,A     ;SAVE DIAL AND HOOK INFO
00C3  FD       135              MOV   A,R5
00C4  8D       136              ORLD  P5,A     ;SELECT KEYBOARD LINES
00C5  FC       137              MOV   A,R4
00C6  3C       138              MOVD  P4,A
00C7  23D0     139              MOV   A,#0D0H
00C9  3A       140              OUTL  P2,A     ;CHIP SELECT
00CA  BA04     141              MOV   R2,#4    ;SET COUNTER TO 4
00CC  0C       142              MOVD  A,P4     ;READ KEYBOARD
00CD  67       143  KBRD2:      RRC   A
00CE  F6E1     144              JC    KBRD4    ;SWITCH FOUND
00D0  1B       145              INC   R3       ;INCREMENT KEYBOARD DATA
00D1  EACD     146              DJNZ  R2,KBRD2 ;CHECK FOR ALL SWITCHES
00D3  97       147              CLR   C
00D4  FD       148              MOV   A,R5
00D5  67       149              RRC   A        ;NEXT ROW ON KEYBOARD
00D6  AD       150              MOV   R5,A
00D7  E6DB     151              JNC   KBRD3
00D9  BC10     152              MOV   R4,#10H  ;SET UPPER BIT ON NEXT
                                                CHANNEL
00DB  FC       153  KBRD3:      MOV   A,R4
00DC  67       154              RRC   A
00DD  AC       155              MOV   R4,A
```

```
00DE  E6BD      156           JNC    KBRD1      ;NEXT ROW ON KEYBOARD
00E0  97        157           CLR    C          ;NO DATA
00E1  83        158 KBRD4:    RET
                159 ;******
00E2  Ba01      160 TCODE:    MOV    R2,#1
00E4  14AC      161           CALL   DELAY      ;WAIT 10 MS
00E6  23D0      162           MOV    A,#0D0H
00E8  3A        163           OUTL   P2,A       ;CHIP SELECT
00E9  0E        164           MOVD   A,P6       ;READ TONE DECODERS
                165                             ;B0=350HZ, B1=440HZ
                166                             ;B2=480HZ, B3=620HZ
00EA  00        167           NOP
00EB  83        168           RET
00EC  14F9      169 HOOK:     CALL   HOOKA      ;OPEN HOOK SWITCH
00EE  BA4B      170 HOOKC:    MOV    R2,#75     ;WAIT 750 MILLISECONDS
00F0  14AC      171           CALL   DELAY
00F2  23E0      172 HOOKB:    MOV    A,#0E0H
00F4  3A        173           OUTL   P2,A       ;CHIP SELECT
00F5  230C      174           MOV    A,#0CH     ;SET HOOK BACK ON
00F7  3D        175           MOVD   P5,A
00F8  83        176           RET
00F9  23E0      177 HOOKA:    MOV    A,#0E0H
00FB  3A        178           OUTL   P2,A       ;CHIP SELECT
00FC  2304      179           MOV    A,#4
00FE  3D        180           MOVD   P5,A       ;SET HOOK RELAY OFF
00FF  83        181           RET
0100  14EC      182 TRANS:    CALL   HOOK       ;PULSE HOOK 7500MS
0102  1E        183           INC    R6
0103  FE        184           MOV    A,R6
0104  120A      185           JB0    TRANS0
0106  3477      186           CALL   OFFLED     ;TURN OFF LED'S AND GET OUT
0108  0447      187           JMP    DIAL1
010a  00        188 TRANS0:   NOP
010B  00        189           NOP
010C  00        190           NOP
010D  00        191           NOP
010E  3612      192 TRANS1:   JT0    TRANS6
0110  2429      193           JMP    TRANS3
0112  2305      194 TRANS6:   MOV    A,#5H
0114  39        195           OUTL   P1,A       ;TURN MICROPHONE OFF
0115  14E2      196           CALL   TCODE      ;READ TONE DECODERS
0117  520E      197           JB2    TRANS1     ;480HZ PRESENT (HIGH TONE)
0119  00        198           NOP
011A  00        199           NOP
011B  2306      200 TRANS4:   MOV    A,#6H
011D  39        201           OUTL   P1,A       ;SET MICROPHONE ON
011E  3477      202           CALL   OFFLED
0120  230D      203           MOV    A,#0DH
0122  9D        204           ANLD   P5,A       ;SET DIAL LED ON
0123  2629      205 TRANS2:   JNT0   TRANS3
0125  14B8      206           CALL   KBRD
0127  E623      207           JNC    TRANS2     ;NO KEYS
0129  3477      208 TRANS3:   CALL   OFFLED     ;TURN OFF ALL LEDS
012B  042E      209           JMP    START
012D  23E0      210 TONE:     MOV    A,#0E0H
012F  3A        211           OUTL   P2,A       ;CHIP SELECT
0130  2308      212           MOV    A,#8H
0132  3D        213           MOVD   P5,A       ;SET DIAL ON, HOOK ON
0133  FB        214 TONE0:    MOV    A,R3       ;GET TONE DATA
0134  3E        215           MOVD   P6,A
0135  47        216           SWAP   A
0136  3F        217           MOVD   P7,A       ;OUTPUT TONES
0137  83        218           RET
                219 ;******
                220 ;CALL ADD ON CONFERENCE
                221 ;**
0138  2400      222 ADDON:    JMP    TRANS
                223 ;******
```

```
                        224 ; CONSULTATION
                        225 ;*****
013A  2400              226 CONSLT:   JMP     TRANS
                        227 ;******
013C  342D              228 DIGIT:    CALL    TONE      ;TURN TONE ON
013E  BA0A              229           MOV     R2,#10
0140  14AC              230           CALL    DELAY
0142  149E              231           CALL    XTONE     ;TURN TONE OFF
0144  BA0A              232           MOV     R2,#10
0146  04AC              233           JMP     DELAY
                        234 ;***********
                        235 ; CALL HOLD FUNCTION
                        236 ;
0148  14EC              237 HOLD:     CALL    HOOK      ;OPERATE HOOK SWITCH .750 SEC
014A  2305              238 HOLD1:    MOV     A,#5H
014C  39                239           OUTL    P1,A      ;MICROPHONE OFF
014D  2673              240           JNT0    HOLDA     ;ABORT HOLD FUNCTION
014F  14E2              241           CALL    TCODE     ;GET TONE DECODERS
0151  524A              242           JB2     HOLD1     ;HIGH TONE 480 HZ
0153  00                243           NOP
0154  00                244           NOP
0155  2306              245           MOV     A,#6H
0157  39                246           OUTL    P1,A      ;MICROPHONE ON
0158  BBFF              247           MOV     R3,#0FFH  ;
015A  343C              248           CALL    DIGIT
015C  BBB7              249           MOV     R3,#0B7H  ;DIAL #
015E  343C              250 HOLDX:    CALL    DIGIT
0160  14A6              251           CALL    NTONE
0162  3477              252           CALL    OFFLED    ;OFF FUNCTION LED
0164  230B              253           MOV     A,#0BH
0166  9D                254           ANLD    P5,A      ;SET COMPLETED LED
0167  2673              255 HOLD2:    JNT0    HOLDA     ;ABORT IF ON HOOK
0169  14B8              256           CALL    KBRD
016B  F667              257           JC      HOLD2     ;WAIT FOR FINGER OFF KEYS
016D  2673              258 HOLD3:    JNT0    HOLDA     ;ABORT FUNCTION
016F  14B8              259           CALL    KBRD
0171  E66D              260           JNC     HOLD3     ;NO OTHER COMMANDS
0173  3477              261 HOLDA:    CALL    OFFLED    ;OFF ANY LEDS
0175  042E              262           JMP     START
0177  23D0              263 OFFLED:   MOV     A,#0D0H
0179  3A                264           OUTL    P2,A      ;SELECT LED'S
017A  FF                265           MOV     A,R7
017B  9681              266           JNZ     OFFLE1
017D  230F              267           MOV     A,#0FH
017F  2483              268           JMP     OFFLE2
0181  2307              269 OFFLE1:   MOV     A,#7
0183  3D                270 OFFLE2:   MOVD    P5,A      ;TURN OFF ANY LEDS
0184  83                271           RET
0185  14E2              272 PICKUP:   CALL    TCODE     ;GET TONE DECODERS
0187  128D              273           JB0     PICK1     ;DIAL TONE 350 & 440 HZ
0189  328D              274           JB1     PICK1
018B  24AF              275           JMP     PICKU1    ;DIAL TONE PRESENT NOW PICK UP CALL
018D  14EC              276 PICK1:    CALL    HOOK      ;NO DIAL TONE SO PLACE CALL ON HOLD
018F  2305              277 PICK2:    MOV     A,#5H
0191  39                278           OUTL    P1,A      ;MICROPHONE OFF
0192  2673              279           JNT0    HOLDA     ;ABORT IF HOOK SWITCH ON
0194  14E2              280           CALL    TCODE
0196  528F              281           JB2     PICK2     ;WAIT FOR HIGH TONE 480HZ
0198  00                282           NOP
0199  00                283           nop
019A  2306              284           MOV     A,#6H
019C  39                285           OUTL    P1,A
019D  BBFF              286           MOV     R3,#0FFH
019F  343C              287           CALL    DIGIT     ;DIAL # TO PLACE CALL ON
```

| | | | | | |
|---|---|---|---|---|---|
| | | | HOLD | | |
| 01A1 | BBB7 | 288 | MOV | R3,#0B7H | |
| 01A3 | 343C | 289 | CALL | DIGIT | |
| 01A5 | 14A6 | 290 | CALL | NTONE | |
| 01A7 | 2673 | 291 PICK3: | JNTO | HOLDA | ;ABORT IF ON HOOK |
| 01A9 | 14E2 | 292 | CALL | TCODE | ;GET TONE DECODERS |
| 01AB | 12A7 | 293 | JB0 | PICK3 | ;WAIT FOR DIAL TONE |
| 01AD | 32A7 | 294 | JB1 | PICK3 | ;350 7 440 HZ |
| 01AF | BBFF | 295 PICKU1: | MOV | R3,#0FFH | |
| 01B1 | 343C | 296 | CALL | DIGIT | ;DIAL * TO PICK UP CALL |
| 01B3 | BBE7 | 297 | MOV | R3,#0E7H | |
| 01B5 | 245E | 298 | JMP | HOLDX | ;CONTINUE AS IF END OF HOLD |
| | | 299 ;******** | | | |
| | | 300 ; FORWARD ALL CALLS | | | |
| 01B7 | 440C | 301 BAD: | JMP | ABRTFD | ;ABORT |
| 01B9 | BE01 | 302 FORALL: | MOV | R6,#1 | ;SET PROGRAMMED TO 1 |
| 01BB | 14E2 | 303 | CALL | TCODE | ;CHECK FOR DIAL TONE |
| 01BD | 12B7 | 304 | JB0 | BAD | ;ABORT IF NO DIAL TONE |
| 01BF | 32B7 | 305 | JB1 | BAD | ;350 7 440 HZ |
| 01C1 | BBFF | 306 | MOV | R3,#0FFH | |
| 01C3 | 342D | 307 | CALL | TONE | ;SET DIALER ON |
| 01C5 | BBDD | 308 | MOV | R3,#0DDH | |
| 01C7 | 343C | 309 | CALL | DIGIT | ;DIAL 55 TO FORWARD ALL |
| | | CALLS | | | |
| 01C9 | BBDD | 310 | MOV | R3,#0DDH | |
| 01CB | 343C | 311 FORAL0: | CALL | DIGIT | |
| 01CD | 14A6 | 312 | CALL | NTONE | ;SET DIALER OFF |
| 01CF | 3477 | 313 | CALL | OFFLED | ;SET LEDS OFF |
| 01D1 | 230D | 314 | MOV | A,#0DH | |
| 01D3 | 9D | 315 | ANLD | P5,A | ;SET DIALER ON LED |
| 01D4 | 2673 | 316 FORAL1: | JNTO | HOLDA | ;ABORT IF ON HOOK |
| 01D6 | 14B8 | 317 | CALL | KBRD | ;ANY DIGITS |
| 01D8 | E6EB | 318 | JNC | FORAL2 | |
| 01DA | 23F4 | 319 | MOV | A,#-12 | |
| 01DC | 6B | 320 | ADD | A,R3 | ;NO FUNCTION KEYS |
| 01DD | F6EB | 321 | JC | FORAL2 | |
| 01DF | 1451 | 322 | CALL | CODE | ;GET KBRD CODE |
| 01E1 | 342D | 323 | CALL | TONE | ;ON TONE GENERATORS |
| 01E3 | 2673 | 324 FORAL3: | JNTO | HOLDA | ;ABORT IF ON HOOK |
| 01E5 | 14B8 | 325 | CALL | KBRD | |
| 01E7 | F6E3 | 326 | JC | FORAL3 | ;KEEP TONE ON AS LONG AS |
| | | KEY IS ON | | | |
| 01E9 | 14A6 | 327 | CALL | NTONE | |
| 01EB | 2305 | 328 FORAL2: | MOV | A,#5H | ;OFF MICROPHONE |
| 01ED | 39 | 329 | OUTL | P1,A | |
| 01EE | 14E2 | 330 | CALL | TCODE | |
| 01F0 | 52D4 | 331 | JB2 | FORAL1 | ;CHECK FOR HIGH TONE 480 HZ |
| 01F2 | 2306 | 332 | MOV | A,#6H | |
| 01F4 | 39 | 333 | OUTL | P1,A | ;ON MICROPHONE |
| 01F5 | FE | 334 | MOV | A,R6 | ;GET PROGRAMMED FUNCTION |
| 01F6 | 4F | 335 | ORL | A,R7 | |
| 01F7 | AF | 336 | MOV | R7,A | ;STORE IN REG 7 |
| 01F8 | 3477 | 337 | CALL | OFFLED | ;OFF LEDS |
| 01FA | 2303 | 338 | MOV | A,#3 | ;SET PROGRAMMED & COMPLET- |
| | | ED LED'S | | | |
| 01FC | 9D | 339 | ANLD | P5,A | |
| 01FD | 00 | 340 | NOP | | |
| 01FE | 00 | 341 | NOP | | |
| 01FF | 00 | 342 | NOP | | |
| 0200 | 260A | 343 FORAL4: | JNTO | HOLDB | ;ABORT IF ON HOOK |
| 0202 | 14B8 | 344 | CALL | KBRD | |
| 0204 | F600 | 345 | JC | FORAL4 | ;WAIT FOR NO KEYS PUSHED |
| 0206 | 260A | 346 FORAL5: | JNTO | HOLDB | ;ABORT IF ON HOOK |
| 0208 | 4406 | 347 | JMP | FORAL5 | |
| 020A | 2473 | 348 HOLDB: | JMP | HOLDA | |
| 020C | 3477 | 349 ABRTFD: | CALL | OFFLED | ;OFF ALL LEDS |
| 020E | 260A | 350 | JNTO | HOLDB | |
| 0210 | BA21 | 351 | MOV | R2,#33 | ;FLASH ACCEPT LED AT 330 |

```
                         MS RATE
0212  14AC      352              CALL    DELAY
0214  3477      353              CALL    OFFLED
0216  230B      354              MOV     A,#0BH    ;SET COMPLETED LED ON & OFF
0218  9D        355              ANLD    P5,A
0219  BA21      356              MOV     R2,#33
021B  14AC      357              CALL    DELAY
021D  440C      358              JMP     ABRTFD
                359  ;*********
                360  ;CANCEL FORWARD ALL CALLS
021F  2306      361  XALL:       MOV     A,#6
0221  5F        362              ANL     A,R7      ;CLEAR BIT 1
0222  AF        363              MOV     R7,A
0223  BBFF      364              MOV     R3,#0FFH
0225  342D      365              CALL    TONE      ;TURN DIALER ON
0227  BBDD      366              MOV     R3,#0DDH  ;DIAL 56 TO CANCEL
                     FORWARD ALL CALLS
0229  343C      367              CALL    DIGIT
022B  BBBD      368              MOV     R3,#0BDH
022D  343C      369  XALL1:      CALL    DIGIT     ;DIAL 56
022F  14A6      370              CALL    NTONE
0231  B832      371              MOV     R0,#50    ;.5 SEC PAUSE
0233  2305      372  XALL2:      MOV     A,#5H
0235  39        373              OUTL    P1,A      ;MICROPHONE OFF
0236  2649      374              JNT0    ERROR
0238  14E2      375              CALL    TCODE
023A  5233      376              JB2     XALL2     ;WAIT FOR HIGH TONE 480HZ
023C  2306      377  PASS:       MOV     A,#6H
023E  39        378              OUTL    P1,A      ;MICROPHONE ON
023F  3477      379              CALL    OFFLED    ;TURN OFF LEDS
0241  FF        380              MOV     A,R7
0242  96CD      381              JNZ     CANC3     ;MORE CANCEL FUNCTIONS
0244  230B      382              MOV     A,#0BH    ;SET HANG-UP LED ON
0246  3D        383              MOVD    P5,A
0247  4406      384              JMP     FORAL5    ;END OF FUNCTION
0249  440C      385  ERROR:      JMP     ABRTFD    ;FLASH COMPLETED LITE
                386  ;********
                387  ; FORWARD BUSY DONTT ANSWER
024B  00        388  FORBZY      NOP
024C  00        389              NOP
024D  BE02      390              MOV     R6,#2     ;SET PROGRAMMED TO 2
024F  14E2      391              CALL    TCODE     ;GET TONES
0251  1249      392              JB0     ERROR     ;CHECK FOR DIAL TONE 350
                     & 440 HZ
0253  3249      393              JB1     ERROR
0255  BBFF      394              MOV     R3,#0FFH
0257  342D      395              CALL    TONE      ;TURN DIALER ON
0259  BBDD      396              MOV     R3,#0DDH
025B  343C      397              CALL    DIGIT
025D  BBBE      398              MOV     R3,#0BEH
025F  24CB      399              JMP     FORAL0
                400  ;******
                401  ; CANCEL FORWARD BUSY
0261  2305      402  XBZY :      MOV     A,#5
0263  5F        403              ANL     A,R7      ;CLEAR BIT 2
0264  AF        404              MOV     R7,A
0265  443C      405              JMP     PASS
0267  BBFF      406              MOV     R3,#0FFH
0269  342D      407              CALL    TONE      ;TURN DIALER ON
026B  BBDD      408              MOV     R3,#0DDH
026D  343C      409              CALL    DIGIT     ;54
026F  BBED      410              MOV     R3,#0EDH
0271  442D      411              JMP     XALL1     ;CONTINUE AS IF CANCEL
                     FORWARD ALL
                412  ;********
                413  ; AUTO CALL BACK
0273  BE04      414  AUTOCL:     MOV     R6,#4     ;SET PROGRAMMED TO 4
0275  00        415              NOP
0276  00        416              NOP
0277  2305      417  AUTOCO:     MOV     A,#5      ;TURN MICROPHONE OFF
```

```
0279  39            418              OUTL      P1,A
027A  14E2          419              CALL      TCODE    ;TONE DECODERS=BUSY
027C  1282          420              JB0       AUTOC1   ;CHECK FOR RE-ORDER TONE
027E  3282          421              JB1       AUTOC1   ;480 & 620 HZ
0280  4449          422              JMP       ERROR
0282  5277          423 AUTOC1:      JB2       AUTOC0   ;WAIT FOR DIAL TONE
0284  7277          424              JB3       AUTOC0   ;350 & 440HZ
0286  BBFF          425              MOV       R3,#0FFH
0288  342D          426              CALL      TONE     ;SET DIALER ON
028A  BBFF          427              MOV       R3,#0FFH
028C  343C          428              CALL      DIGIT
028E  BBDD          429              MOV       R3,#0DDH ;DIAL 5 FOR AUTO CALL
                        BACK FUNCTION
0290  24CB          430              JMP       FORAL0   ;AND CONTINUE AS IF FOR
                        WARD ALL CALLS
                    431 ;*******
                    432 ; CANCEL AUTO CALL BACK
0292  2303          433 XAUTO:       MOV       A,#3
0294  5F            434              ANL       A,R7     ;CLEAR BIT 3
0295  AF            435              MOV       R7,A
0296  BBFF          436              MOV       R3,#0FFH
0298  342D          437              CALL      TONE     ;TURN DIALER ON
029A  BBDD          438              MOV       R3,#0DDH
029C  343C          439              CALL      DIGIT    ;DIAL 58
029E  BBDB          440              MOV       R3,#0DBH
02A0  442D          441              JMP       XALL1    ;CONTINUE AS IF CANCEL
                        FORWARD ALL CALLS
                    442 ;*******
                    443 ; CALL WAITING
02A2  2448          444 WAITG:       JMP       HOLD     ;PLACE CALL ON HOOK
                    445 ;*******
                    446 ; SPEED CALLING
02A4  14ED          447 SPEED:       CALL      TCODE
02A6  1249          448              JB0       ERROR
02A8  3249          449              JB1       ERROR    ;CHECK FOR DIAL TONE 350 ?
                        440 HZ
02AA  14E2          450              MOV       R3,#0FFH ;TURN DIALER ON
02AC  342D          451              CALL      TONE
02AE  BBDD          452              MOV       R3,#0DCH ; ;DIAL 51
02B0  343C          453              CALL      DIGIT    ;TURN DIALER ON
02B2  BBEE          454              MOV       R3,#0EEH
02B4  343C          455              CALL      DIGIT
02B6  14A6          456              CALL      NTONE
02B8  241B          457              JMP       TRANS4   ;CONTINUE ON AS IF CALL
                        TRANSFER
02BA  14E2          458 CANCEL:      CALL      TCODE
02BC  1249          459              JB0       ERROR    ;CHECK FOR DIAL TONE
02BE  3249          460              JB1       ERROR
02C0  FF            461 CANC2 :      MOV       A,R7
02C1  12CB          462              JB0       CANC1
02C3  3261          463              JB1       XBZY     ;CANCEL FORWARD BUSY
02C5  5292          464              JB2       XAUTO    ;CANCEL AUTO CALL BACK
02C7  BF07          465              MOV       R7,#7    ;CANCEL ALL FUNCTIONS
02C9  44C0          466              JMP       CANC2
02CB  441F          467 CANC1:       JMP       XALL     ;CANCEL FORWARD ALL
02CD  14F9          468 CANC3:       CALL      HOOKA    ;OPEN HOOK RELAY
02CF  BAC8          469              MOV       R2,#200  ;WAIT 2 SECONDS FOR DIAL
                        TONE
02D1  14AC          470              CALL      DELAY
02D3  14F2          471              CALL      HOOKB    ;CLOSE HOOK SWITCH
02D5  14EE          472              CALL      HOOKC    ;WAIT FOR DIAL TONE
02D7  44C0          473              JMP       CANC2
0300                474              ORG       300H     ;NEXT PAGE
                    475 ;****PERSONAL PHONE #'S STORED IN PHONE****
0007                476 DIGITS       SET       7        ;14 PHONE #'S TO DIAL
000E                477 MEMORY       SET       0EH      ;MEMORY START
0300  BE00          478 BOOK:        MOV       R6,#0    ;CLEAR STORE FLAG
0302  14B8          479 BOOK0:       CALL      KBRD     ;KEY STILL PUSHED
0304  F602          480              JC        BOOK0    ;WAIT
```

| | | | | | |
|---|---|---|---|---|---|
| 0306 | 2693 | 481 BOOK1: | JNTO | FINSH | ;PHONE ON HOOK-ABORT |
| 0308 | 14B8 | 482 | CALL | KBRD | ;ANY KEYBOARD DATA |
| 030A | E606 | 483 | JNC | BOOK1 | |
| 030C | B923 | 484 | MOV | R1,#(DIGITS*3)+MEMORY | |
| | | 485 | ;COMPUTE PHONE # MEMORY SLOT | | |
| 030E | FB | 486 | MOV | A,R3 | ;GET KEY VALUE |
| 030F | C638 | 487 | JZ | BOOK2 | ;KEY3 |
| 0311 | B938 | 488 | MOV | R1,#DIGITS*6+MEMORY | |
| 0313 | 07 | 489 | DEC | A | |
| 0314 | C638 | 490 | JZ | BOOK2 | ;KEY6 |
| 0316 | B91C | 491 | MOV | R1,#DIGITS*2+MEMORY | |
| 0318 | 03FD | 492 | ADD | A,#-3 | |
| 031A | C638 | 493 | JZ | BOOK2 | ;KEY 2 |
| 031C | B931 | 494 | MOV | R1,#Digits*5+MEMORY | |
| 031E | 07 | 495 | DEC | A | |
| 031F | C638 | 496 | JZ | BOOK2 | ;KEY 5 |
| 0321 | B915 | 497 | MOV | R1,#DIGITS*1+MEMORY | |
| 0323 | 03FD | 498 | ADD | A,#-3 | |
| 0325 | C638 | 499 | JZ | BOOK2 | ;KEY 1 |
| 0327 | B92A | 500 | MOV | R1,#DIGITS*4+MEMORY | |
| 0329 | 07 | 501 | DEC | A | |
| 032A | C638 | 502 | JZ | BOOK2 | ;KEY 4 |
| 032C | B93F | 503 | MOV | R1,#DIGITS*7+MEMORY | |
| 032E | 07 | 504 | DEC | A | |
| 032F | C638 | 505 | JZ | BOOK2 | ;KEY 7 |
| 0331 | 07 | 506 | DEC | A | |
| 0332 | 9693 | 507 | JNZ | FINISH | ;NOT VALID KEY |
| 0334 | BE01 | 508 | MOV | R6,#1 | |
| 0336 | 6402 | 509 | JMP | BOOK0 | ;WAIT FOR ANOTHER KEY |
| 0338 | 3477 | 510 BOOK2: | CALL | OFFLED | |
| 033A | 230D | 511 | MOV | A,#0DH | ;SET DIAL LED ON |
| 033C | 9D | 512 | ANLD | P5,A | |
| 033D | EE81 | 513 | DJNZ | R6,BOOKA | ;JUMP TO DIAL PHONE NUMBER |
| 033F | BE07 | 514 | MOV | R6,#DIGITS | ;ENTER PHONE #'S |
| 0341 | B1FF | 515 BOOK3: | MOV | @R1,#-1 | ;SCRUB MEMORY SLOT |
| 0343 | C9 | 516 | DEC | R1 | ;DECREMENT MEMORY POINTER |
| 0344 | EE41 | 517 | DJNZ | R6,BOOK3 | |
| 0346 | 19 | 518 | INC | R1 | ;SET MEMORY TO CORRECT STARTING POINT |
| 0347 | 14B8 | 519 BOOK4: | CALL | KBRD | ;WAIT FOR NO KEYS |
| 0349 | F647 | 520 | JC | BOOK4 | |
| 034B | 2693 | 521 BOOK5: | JNTO | FINISH | ;HOOK SWITCH=HANG UP |
| 034D | 14B8 | 522 | CALL | KBRD | |
| 034F | E64B | 523 | JNC | BOOK5 | ;WAIT FOR NEXT KEY |
| 0351 | 23F4 | 524 | MOV | A,#-12 | |
| 0353 | 6B | 525 | ADD | A,R3 | ;ABORT IF A FUNCTION KEY PRESSED |
| 0354 | F693 | 526 | JC | FINISH | |
| 0356 | BE07 | 527 | MOV | R6,#DIGITS | ;SET COUNTER TO # OF MEMORYS |
| 0358 | F9 | 528 | MOV | A,R1 | ;SET REGISTER 1 TO REG 0 |
| 0359 | A8 | 529 | MOV | R0,A | |
| 035A | F0 | 530 BOOK6: | MOV | A,@R0 | ;GET MEMORY DATA |
| 035B | 47 | 531 | SWAP | A | |
| 035C | 53F0 | 532 | ANL | A,#0F0H | ;MASK OFF LSBYTE |
| 035E | 6B | 533 | ADD | A,R3 | ;ADD IN NEW DIGIT |
| 035F | 20 | 534 | XCH | A,@R0 | ;SWAP MEMORY CONTENTS |
| 0360 | 47 | 535 | SWAP | A | |
| 0361 | 530F | 536 | ANL | A,#0FH | ;SAVE MSDIGIT |
| 0363 | AB | 537 | MOV | R3,A | ;IN REGISTER 3 |
| 0364 | 18 | 538 | INC | R0 | ;NEXT MEMORY |
| 0365 | EE5A | 539 | DJNZ | R6,BOOK6 | ;ALL 6 MEMORYS |
| 0367 | F1 | 540 | MOV | A,@R1 | ;GET LAST DIAL DIGIT IN MEMORY |
| 0368 | 745C | 541 | CALL | BOOKX | ;TONE THE LINE |
| 036A | 6447 | 542 | JMP | BOOK4 | |
| 036C | 530F | 543 BOOKX: | ANL | A,#0FH | ;MASK OFF INTERESTED DIGIT |
| 036E | A8 | 544 | MOV | R0,A | ;SAVE DATA |
| 036F | 23F4 | 545 | MOV | A,#-12 | |

```
0371  68       546            ADD    A,R0       ;DIAL DIGIT
0372  F680     547            JC     BOOKY      ;NO=JUMP
0374  BBFF     548            MOV    R3,#0FFH
0376  342D     549            CALL   TONE       ;SET DIALER ON
0378  F8       550            MOV    A,R0       :MOVE DIAL DIGIT TO R3
0379  AB       551            MOV    R3,A
037A  1451     552            CALL   CODE       ;CONVERT KEYBOARD VALUE
                        TO TONE GENERATOR CODE
037C  343C     553            CALL   DIGIT      ;START DIALER
037E  14A6     554            CALL   NTONE      ;DIALER OFF
0380  83       555 BOOKY:     RET
0381  BE07     556 BOOKA:     MOV    R6,#DIGITS ;SET # OF DIGITS
0383  F1       557 BOOKB:     MOV    A,@R1      ;GET DESIRED DIAL DIGIT
0384  47       558            SWAP   A          ;MSDIGIT FIRST
0385  746C     559            CALL   BOOKX      ;TONE DATA
0387  F1       560            MOV    A,@R1      ;GET NEXT DIGIT
0388  746C     561            CALL   BOOKX
038A  C9       562            DEC    R1         ;DECREMENT MEMORY
                        REGISTER
038B  EE83     563            DJNZ   R6,BOOKB   ;SEND ALL DIGITS
038D  14B8     564 BOOKC:     CALL   KBRD       ;NO KEYS ON
038F  F68D     565            JC     BOOKC
0391  042E     566            JMP    START
0393  4449     567 FINSH:     JMP    ERROR      ;ABORT FUNCTION
               568            END
```

USER SYMBOLS

| | | | | | | | |
|---|---|---|---|---|---|---|---|
| ABRTFD | 020C | ADDON | 0138 | AUTOCO | 0277 | AUTOC1 | 0282 |
| AUTOCL | 0273 | BAD | 01B7 | BELL | 0004 | BELL0 | 000B |
| BELL1 | 001B | BELL2 | 001D | BELL3 | 0021 | BELL4 | 0029 |
| BOOK | 0300 | BOOK0 | 0302 | BOOK1 | 0306 | BOOK2 | 0338 |
| BOOK3 | 0341 | BOOK4 | 0347 | BOOK5 | 034B | BOOK6 | 035A |
| BOOKA | 0381 | BOOKB | 0383 | BOOKC | 038D | BOOKX | 036C |
| BOOKY | 0380 | CANC1 | 02CB | CANC2 | 02C0 | CANC3 | 02CD |
| CANCEL | 02BA | CODE | 0051 | CODE1 | 0053 | CODE2 | 0055 |
| CODE3 | 0065 | CONSLT | 013A | DELA1 | 00B0 | DELA2 | 00B4 |
| DELAY | 00AC | DIAL1 | 0047 | DIGIT | 013C | DIGITS | 0007 |
| ERROR | 0249 | F01 | 0086 | F02 | 0088 | F03 | 008A |
| F04 | 008C | F05 | 008E | F06 | 0090 | F07 | 0092 |
| F08 | 0094 | F09 | 0096 | F10 | 0098 | F11 | 009A |
| F12 | 009C | FCTNT | 0079 | FINSH | 0393 | FORAL0 | 01CB |
| FORAL1 | 01D4 | FORAL2 | 01EB | FORAL3 | 01E3 | FORAL4 | 0200 |
| FORAL5 | 0206 | FORALL | 01B9 | FORBZY | 024B | FUNCT | 006F |
| HOLD | 0148 | HOLD1 | 014A | HOLD2 | 0167 | HOLD3 | 016D |
| HOLDA | 0173 | HOLDB | 020A | HOLDX | 015E | HOOK | 00EC |
| HOOKA | 00F9 | HOOKB | 00F2 | HOOKC | 00EE | KBRD | 00B8 |
| KBRD1 | 00BD | KBRD2 | 00CD | KBRD3 | 00DB | KBRD4 | 00E1 |
| MEMORY | 000E | NTONE | 00A6 | OFFLE1 | 0181 | OFFLE2 | 0183 |
| OFFLED | 0177 | PASS | 023C | PICK1 | 018D | PICK2 | 018F |
| PICK3 | 01AC | PICKU1 | 01AF | PICKUP | 0185 | SPEED | 02A4 |
| STAR1 | 003A | START | 002E | TCODE | 00E2 | TONE | 012D |
| TONE0 | 0133 | TRANS | 0100 | TRANS0 | 010A | TRANS1 | 010E |
| TRANS2 | 0123 | TRANS3 | 0129 | TRANS4 | 011B | TRANS6 | 0112 |
| WAITG | 02A2 | XALL | 021F | XALL1 | 022D | XALL2 | 0233 |
| XAUTO | 0292 | XBZY | 0261 | XTONE | 009E | | |

From the above description it can be seen that the present invention is a telephone set having multiple function capability and is microprocessor controlled to automatically initiate a selected function upon simple command of the operator. Communication to the telephone switch gear is maintained over the conventional two wire telephone network and function comand and confirmation signals are transmitted and received over said two wire network. The telephone set of the present invention significantly increases the utility of the telephone through the provision of multiple functions and leads to maximum utilization of the capabilities of current sophisticated switch gear.

What is claimed is:

1. A telephone set for use in a telephone network having a switch gear connected to incoming telephone lines and to a plurality of telephone stations for establishing communication between selected stations and-/or incoming lines, the telephone set including means for receiving and transmitting voice communications and the switch gear having a memory capability to receive command and control signals from the telephone set, transmit confirmation and control signals to the telephone set, and perform selected functions in response to the the command and control signals, comprising:

(a) a plurality of manually actuated switches, each of said switches corresponding to a selected function;

(b) a programmable microprocessor having means for automatically scanning said switches, detecting an actuated switch and generating a plurality of command and control signals in a predetermined sequence associated with a selected function;
(c) means for transmitting selected ones of said command and control signals to the switch gear; and
(d) means for receiving confirmation and control signals from the switch gear and transmitting said confirmation and control signals to said microprocessor.

2. A telephone set in accordance with claim 1 further comprising means responsive to selected ones of said command and control signals to provide a visual indication of additional manual steps to be performed to complete said selected function or completion of said function.

3. A telephone set in accordance with claim 1 wherein said means for transmitting selected ones of said command and control signals comprises means for generating tone signals in response to selected ones of said command and control signals.

4. A telephone set in accordance with claim 1 wherein the confirmation and control signals transmitted by the switching system are coded tone signals and said means for receiving said confirmation and control signals comprises a plurality of tone decoders.

5. A telephone set in accordance with claim 4 wherein the telephone has means for transmitting voice communications including an audio receiver and further comprising means for disabling said audio receiver while said confirmation and control signals are being received by said telephone set.

6. A telephone set for use in a telephone communication network having a switch gear connected to incoming lines and to a plurality of terminal stations each terminal station connected to a wire pair over which audio signals are transmitted, the switch gear having means for selectively establishing communication between selected terminal stations and incoming lines, means for receiving command signals from the telephone stations corresponding to a selected function, means for generating a coded confirmation signal and transmitting the confirmation signal to the telephone stations in response to the command signals, and means for performing the function dictated by command signals, comprising:
(a) a plurality of manually actuated switches, each switch associated with a particular function;
(b) a microprocessor, said microprocessor having means for automatically scanning said switches and generating a plurality of first output signals in a pre-determined sequence corresponding to a selected function;
(c) a tone generator connected to said microprocessor for generating a coded tone command signal in response to selected ones of said first output signals for transmission of the switch gear over the wire pair over which audio signals are transmitted;
(d) a plurality of tone detectors each detector tuned to a pre-selected response frequency and having an input connected to the two-wire audio communications lines and an output connected to said microprocessor, said tone detectors generating a second output signal on said output thereof in response to detection of a confirmation signal having the preselected frequency of said tone detector; and
(e) a plurality of visual indicators, each of said visual indicators connected to an output of said microprocessor, said microprocessor having means for automatically applying excitation signals to said visual indicators corresponding to said second output signals thereby providing a visual indication of additional manual steps to be performed to complete said selected function or completion of said function.

7. A telephone set in accordance with claim 6 comprising:
(a) means for transmitting and receiving voice communications; and
(b) means connected to said microprocessor and responsive to disabling signals therefrom for disabling said voice receiving and transmitting means during receipt of coded confirmation signals from the switch gear.

* * * * *